US009121947B2

(12) United States Patent
Nikolic et al.

(10) Patent No.: US 9,121,947 B2
(45) Date of Patent: Sep. 1, 2015

(54) STRESS REDUCTION FOR PILLAR FILLED STRUCTURES

(71) Applicants: Lawrence Livermore National Security, LLC, Livermore, CA (US); University of Nebraska-Lincoln, Lincoln, NE (US)

(72) Inventors: Rebecca J. Nikolic, Oakland, CA (US); Adam Conway, Livermore, CA (US); Qinghui Shao, Fremont, CA (US); Lars Voss, Livermore, CA (US); Chin Li Cheung, Lincoln, NE (US); Mushtaq A. Dar, Srinagar (IN)

(73) Assignee: Lawrence Livermore National Security, LLC, Livermore, CA (US)

( * ) Notice: Subject to any disclaimer, the term of this patent is extended or adjusted under 35 U.S.C. 154(b) by 267 days.

(21) Appl. No.: 13/742,298

(22) Filed: Jan. 15, 2013

(65) Prior Publication Data

US 2013/0187056 A1    Jul. 25, 2013

Related U.S. Application Data

(60) Provisional application No. 61/589,771, filed on Jan. 23, 2012.

(51) Int. Cl.
*G01T 3/00* (2006.01)
(52) U.S. Cl.
CPC .. *G01T 3/00* (2013.01); *G01T 3/008* (2013.01)
(58) Field of Classification Search
CPC ................................. G01T 3/00; G01T 3/008
USPC ........................................ 250/370.05, 390.01
See application file for complete search history.

(56) References Cited

U.S. PATENT DOCUMENTS

| 3,116,417 A | 12/1963 | Orr et al. |
| 3,750,046 A | 7/1973 | Buehler et al. |
| 3,817,633 A | 6/1974 | White |
| 3,988,586 A | 10/1976 | Stuart et al. |
| 4,127,499 A | 11/1978 | Chen et al. |
| 4,482,808 A | 11/1984 | Tominaga et al. |
| 4,652,532 A | 3/1987 | Bain et al. |

(Continued)

FOREIGN PATENT DOCUMENTS

| EP | 0129364 A2 | 12/1984 |
| EP | 0 352 952 A2 | 1/1990 |

(Continued)

OTHER PUBLICATIONS

Nikolic et al., "Si pillar structured thermal neutron detectors: fabrication challenges and performance expectations", Apr. 21, 2011, Lawrence livermore national laboratory, LLNL-PROC-480809, 13 pages.*

(Continued)

*Primary Examiner* — David Porta
*Assistant Examiner* — Mindy Vu
(74) *Attorney, Agent, or Firm* — Zilka-Kotab, PC

(57) ABSTRACT

According to one embodiment, an apparatus for detecting neutrons includes an array of pillars, wherein each of the pillars comprises a rounded cross sectional shape where the cross section is taken perpendicular to a longitudinal axis of the respective pillar, a cavity region between each of the pillars, and a neutron sensitive material located in each cavity region.

43 Claims, 11 Drawing Sheets

(56) References Cited

U.S. PATENT DOCUMENTS

| | | | |
|---|---|---|---|
| 4,692,266 A | 9/1987 | Costa et al. | |
| 4,718,417 A | 1/1988 | Kittrell et al. | |
| 4,930,516 A | 6/1990 | Alfano et al. | |
| 4,957,114 A | 9/1990 | Zeng et al. | |
| 5,042,494 A | 8/1991 | Alfano | |
| 5,131,398 A | 7/1992 | Alfano et al. | |
| 5,261,410 A | 11/1993 | Alfano et al. | |
| 5,313,306 A | 5/1994 | Kuban et al. | |
| 5,348,018 A | 9/1994 | Alfano et al. | |
| 5,436,655 A | 7/1995 | Hiyama et al. | |
| 5,467,767 A | 11/1995 | Alfano et al. | |
| 5,474,816 A * | 12/1995 | Falabella | 427/580 |
| 5,593,879 A | 1/1997 | Steller et al. | |
| 5,606,638 A | 2/1997 | Tymianski et al. | |
| 5,726,453 A | 3/1998 | Lott et al. | |
| 5,769,081 A | 6/1998 | Alfano et al. | |
| 5,833,596 A | 11/1998 | Bonnell et al. | |
| 5,847,394 A | 12/1998 | Alfano et al. | |
| 5,872,363 A | 2/1999 | Bingham et al. | |
| 5,940,460 A | 8/1999 | Seidel et al. | |
| 5,949,069 A | 9/1999 | Chace et al. | |
| 5,975,899 A | 11/1999 | Badoz et al. | |
| 5,976,076 A | 11/1999 | Kolff et al. | |
| 5,997,472 A | 12/1999 | Bonnell et al. | |
| 6,169,289 B1 | 1/2001 | White et al. | |
| 6,255,657 B1 | 7/2001 | Cole et al. | |
| 6,269,169 B1 | 7/2001 | Funk et al. | |
| 6,413,267 B1 | 7/2002 | Dumoulin-White et al. | |
| 6,462,770 B1 | 10/2002 | Cline et al. | |
| 6,477,403 B1 | 11/2002 | Eguchi et al. | |
| 6,529,769 B2 | 3/2003 | Zigler | |
| 6,544,442 B1 | 4/2003 | Bell et al. | |
| 6,598,428 B1 | 7/2003 | Cryan et al. | |
| 6,687,000 B1 | 2/2004 | White | |
| 6,730,019 B2 | 5/2004 | Irion | |
| 6,775,567 B2 | 8/2004 | Cable et al. | |
| 6,817,633 B2 | 11/2004 | Brill et al. | |
| 6,949,069 B2 | 9/2005 | Farkas et al. | |
| 6,975,898 B2 | 12/2005 | Seibel | |
| 6,975,899 B2 | 12/2005 | Faupel et al. | |
| 7,003,147 B2 | 2/2006 | Inoue | |
| 7,016,717 B2 | 3/2006 | Demos et al. | |
| 7,067,079 B2 | 6/2006 | Bross et al. | |
| 7,145,149 B2 | 12/2006 | Cooke et al. | |
| 7,164,138 B2 | 1/2007 | McGregor et al. | |
| 7,172,553 B2 | 2/2007 | Ueno et al. | |
| 7,257,437 B2 | 8/2007 | Demos et al. | |
| 7,372,041 B1 | 5/2008 | Nagarkar et al. | |
| 7,723,114 B1 | 5/2010 | Coates, Jr. et al. | |
| 7,857,993 B2 | 12/2010 | Dai et al. | |
| 7,863,579 B2 | 1/2011 | Suhami | |
| 7,930,516 B1 | 4/2011 | Jin et al. | |
| 7,945,077 B2 | 5/2011 | Demos | |
| 8,207,507 B2 | 6/2012 | Zaitseva et al. | |
| 8,285,015 B2 | 10/2012 | Demos | |
| 8,314,399 B2 | 11/2012 | Clothier et al. | |
| 8,461,546 B2 | 6/2013 | Payne et al. | |
| 8,580,054 B2 | 11/2013 | Pagoria et al. | |
| 8,584,950 B2 | 11/2013 | Endo et al. | |
| 8,735,843 B2 | 5/2014 | Payne et al. | |
| 8,872,125 B2 | 10/2014 | Zaitseva et al. | |
| 2001/0030744 A1 | 10/2001 | Chang | |
| 2002/0103439 A1 | 8/2002 | Zeng et al. | |
| 2003/0158470 A1 | 8/2003 | Wolters et al. | |
| 2003/0232445 A1 | 12/2003 | Fulghum, Jr. | |
| 2004/0019281 A1 | 1/2004 | Weber et al. | |
| 2004/0175383 A1 | 9/2004 | Barr et al. | |
| 2005/0020926 A1 | 1/2005 | Wiklof et al. | |
| 2005/0208290 A1 | 9/2005 | Patel | |
| 2006/0054863 A1 | 3/2006 | Dai et al. | |
| 2006/0086311 A1 | 4/2006 | Zagumennyi et al. | |
| 2006/0138340 A1 | 6/2006 | Ianakiev et al. | |
| 2006/0255282 A1 * | 11/2006 | Nikolic et al. | 250/390.01 |
| 2007/0160279 A1 | 7/2007 | Demos | |
| 2007/0175383 A1 | 8/2007 | Fukuda et al. | |
| 2008/0017804 A1 | 1/2008 | Krishnamoorthy et al. | |
| 2008/0178904 A1 | 7/2008 | Peters | |
| 2008/0267472 A1 | 10/2008 | Demos | |
| 2009/0023830 A1 | 1/2009 | Imai | |
| 2010/0252741 A1 | 10/2010 | Zaitseva et al. | |
| 2010/0256923 A1 | 10/2010 | Payne et al. | |
| 2011/0266643 A1 | 11/2011 | Engelmann et al. | |
| 2011/0284755 A1 | 11/2011 | Stradins et al. | |
| 2012/0043632 A1 * | 2/2012 | Nikolic et al. | 257/429 |
| 2012/0132819 A1 * | 5/2012 | Climent | 250/370.05 |
| 2012/0241630 A1 | 9/2012 | Walker et al. | |
| 2012/0317791 A1 | 12/2012 | Frank | |
| 2012/0326042 A1 | 12/2012 | Zaitseva et al. | |
| 2013/0033589 A1 | 2/2013 | Demos | |
| 2013/0099125 A1 | 4/2013 | Grodzins | |
| 2013/0175340 A1 | 7/2013 | Endo et al. | |
| 2013/0181135 A1 | 7/2013 | Payne | |
| 2013/0263982 A1 | 10/2013 | Pagoria et al. | |
| 2013/0299702 A1 | 11/2013 | Zaitseva | |
| 2014/0027646 A1 | 1/2014 | Zaitseva et al. | |
| 2014/0291532 A1 | 10/2014 | Payne et al. | |

FOREIGN PATENT DOCUMENTS

| | | |
|---|---|---|
| GB | 2254417 A | 10/1992 |
| WO | 0238040 A2 | 5/2002 |
| WO | 2012/142365 | 10/2012 |
| WO | 2012142365 A2 | 10/2012 |

OTHER PUBLICATIONS

Nikolic et al., "6:1 aspect ratio silicon pillar based thermal neutron detector filled with 10B", Oct. 1, 2008, Barry Chin Li Cheung Publications, 5 pages.*

Nikolic et al., "Fabrication of pillar-structured thermal neutron detectors", IEEE Nuclear Science Symposium Conference Record, 2007, pp. 1577-1580.*

Peurrung, A. J., "Recent developments in neutron detection," 2000 Elsevier Science B.V., Nuclear Instruments and Methods in Physics Research A, vol. 443, 2000, pp. 400-415.

Brooks, F. D., "Development of Organic Scintillators," North-Holland Publishing Co., Nuclear Instruments and Methods, vol. 162, 1979, pp. 477-505.

Vijayan et al., "Growth, optical, thermal and mechanical studies of methyl 4-hydroxybenzoate single crystals," 2003 Elsevier B.V., Journal of Crystal Growth, vol. 256, 2003, pp. 174-182.

Varfolomeeva, V. N., et al., "Polarization Diagrams for the Fluorescence of Single Crystals of Salicylic Acid and Salicylates," Soviet Physics—Crystallography, vol. 13, No. 2, Sep.-Oct. 1968, pp. 209-211.

Mandshukov, I. G., et al., "Properties of a New Class of Organic Scintillators: Derivatives of Salicyclic Acid," 1982 Plenum Publishing Corporation, University of Sofia, Bulgaria, Translated from Pribory i Tekhnika Eksperimenta, No. 3, May-Jun. 1981, pp. 605-611.

Zhao et al., "Characteristics of large-sized Ce:YAG Scintillation crystal grown by temperature gradient technique," 2003 Elsevier B.V., Journal of Crystal Growth, vol. 253, 2003, pp. 290-296.

Non-Final Office Action from U.S. Appl. No. 12/418,434 dated May 20, 2011.

Non-Final Office Action from U.S. Appl. No. 12/418,434 dated Nov. 22, 2011.

Notice of Allowance and Fee(s) Due from U.S. Appl. No. 12/418,434 dated Feb. 23, 2012.

Non-Final Office Action from U.S. Appl. No. 12/418,450 dated Jul. 13, 2011.

Non-Final Office Action from U.S. Appl. No. 12/418,450 dated Nov. 15, 2011.

Final Office Action from U.S. Appl. No. 12/418,450 dated Feb. 24, 2012.

Notice of Allowance and Fee(s) Due from U.S. Appl. No. 12/418,450 dated Oct. 22, 2012.

Non-Final Office Action from U.S. Appl. No. 13/736,898 dated Mar. 8, 2013.

(56) References Cited

OTHER PUBLICATIONS

Anutgan et al., "Effect of heat treatment on the stress and structure evolution of plasma deposited boron nitride thin films," Surface & Coatings Technology, vol. 202, 2008, pp. 3058-3066.
Dusane, R. O., "Opportunities for new materials synthesis by hot wire chemical vapor process," Thin Solid Films, vol. 519, 2011, pp. 4555-4560.
Lattemann et al., "New approach in depositing thick, layered cubic boron nitride coatings by oxygen addition-structural and compositional analysis," Thin Solid Films, vol. 515, 2006, pp. 1058-1062.
Bello et al., "Deposition of thick cubic boron nitride films: The route to practical applications," Diamond & Related Materials, vol. 14, 2005, pp. 1154-1162.
He et al., "Improvement of adhesion of cubic boron nitride filsm: effect of interlayer and deposition parameters," Materials Science Forum, vols. 475-479, 2005, pp. 3637-3638.
Shultis et al., "Efficiencies of Coated and Perforated Semiconductor Neutron Detectors," 2004 IEEE, pp. 4569-4574.
McGregor et al., "New Surface Morphology for Low Stress Thin-Film-Coated Thermal Neutron Detectors," 2002 IEEE, IEEE Transactions on Nuclear Science, vol. 49, No. 4, Aug. 2002, pp. 1999-2004.
Matsumoto et al., "The introducing of fluorine into the deposition of BN: a successful method to obtain high-quality, thick cBN films with low residual stress," Diamond and Related Materials, vol. 10, 2001, pp. 1868-1874.
Karim et al., "Effect of deposition parameters on the formation of cubic BN films deposited by plasma-assisted chemical vapour deposition from non-toxic material," Surface and Coatings Technology, vol. 54-55, 1992, pp. 355-359.
U.S. Appl. No. 13/437,836, filed Apr. 2, 2012.
U.S. Appl. No. 13/471,259, filed May 14, 2012.
U.S. Appl. No. 13/601,918, filed Aug. 31, 2012.
U.S. Appl. No. 13/439,780, filed Apr. 4, 2012.
Bell et al., "Gadolinium- and Boron-Loaded Organic Scintillators for Neutron Detection," Transactions of the American Nuclear Society, vol. 83, 2000, pp. 259-260.
Carturan et al., "Novel Polysiloxane-Based Scintillators for Neutron Detection," Radiation Protection Dosimetry, vol. 143, No. 2-4, 2011, pp. 471-476.
Koshimizu et al., "Organic-Inorganic Hybrid Scintillator for Neutron Detection Fabricated by Sol-Gel Method," Japanese Journal of Applied Physics, vol. 47, No. 7, 2008, pp. 5717-5719.
Brown et al., "Applications of Nanoparticles in Scintillation Detectors," Antiterrorism and Homeland Defence: Polymers and Materials, American Chemical Society, vol. 980, 2008, pp. 117-129.
Binder et al., "Preparation and Investigation of a Pulse Shape Discrimination Plastic," Erkezett:, vol. 14, Dec. 10, 1965, pp. 457-461 (non-translated).
Kim et al., "Performance of Hybrid Plastic Scintillator Detectors for Low-Energy Neutron Measurements," Journal of the Korean Physical Society, vol. 52, No. 3, Mar. 2008, pp. 908-912.
Normand et al., "Discrimination methods between neutron and gamma rays for boron loaded plastic scintillators," Nuclear Instruments & Methods in Physics Research A, vol. 484, 2002, pp. 342-350.
Quaranta et al., "Optical and Scintillation Properties of Polydimethyl-Diphenylsiloxane Based Organic Scintillators," IEEE Transactions on Nuclear Science, vol. 57, No. 2, Apr. 2010, pp. 891-900.
Quaranta et al., "Doping of polysiloxane rubbers for the production of organic scintillators," Optical Materials, vol. 32, No. 10, 2010, pp. 1317-1320.
Hull et al., "New Organic Crystals for Pulse Shape Discrimination," IEEE Transactions on Nuclear Science, vol. 56, No. 3, Jun. 2009, pp. 899-903.
Iwanowska et al., "Composite Scintillators as Detectors for Fast Neutrons and Gamma-Radiation Detection in the Border Monitoring," 2009 IEEE Nuclear Science Symposium Conference Record, pp. 1437-1440.
Hamel et al., "Fluorescent 1,8-naphthalimides-containing polymers as plastic scintillators. An attempt for neutron-gamma discrimination," Reactive & Functional Polymers, vol. 68, No. 12, 2008, pp. 1671-1681.
Kim et al., "Characteristics of Hybrid Plastic Scintillators for Slow Neutron Measurements," 2007 IEEE Nuclear Science Symposium Conference Record, pp. 1971-1975.
Katagiri et al., "Scintillation materials for neutron imaging detectors," Nuclear Instruments & Methods in Physics Research A, vol. 529, 2004, pp. 274-279.
Gervino et al., "A low background, large solid angle neutron detector for spectroscopy and dosimetry application." Sensors and Actuators A, vol. 41-42, 1994, pp. 497-502.
Kubota et al., "A New Solid State Neutron Detector: Particle Identification With a Barium-Fluoride Plastic Scintillator." Nuclear Instruments & Methods in Physics Research, vol. A270, 1998, pp. 598-601.
Andrianov et al., "Synthesis and Properties of 4-Amino-3-Cyanofurazan," 1994 Plenum Publishing Corporation, Chemistry of Heterocyclic Compounds, vol. 30, No. 5, 1994, pp. 608-611.
Shaposhnikov et al., "New Heterocycles with a 3-Aminofurazanyl Substituent," 2002 MAIK, Russian Journal of Organic Chemistry, vol. 38, No. 9, 2002, pp. 1351-1355.
Yarovenko et al., "15N NMR study of the mechanism of the reaction of amidoximes with nitriles in the presence of ZnCl2 and HCl," 1995 Plenum Publishing Corporation, Russian Chemical Bulletin, vol. 43, No. 4, Apr. 1994, pp. 627-629.
Yarovenko et al., "A convenient synthesis of 3-substituted 5-guanidino-1, 2, 4-Oxadiazoles," 1994 Plenum Publishing Corporation, Russian Chemical Bulletin, vol. 43, No. 1, Jan. 1994, pp. 114-117.
Yarovenko et al., "Synthesis of 2-amino-5-(5R-1,2,4-Oxadiazolyl-3)-1,3,4-Oxadiazoles," 1994 Plenum Publishing Corporation, Russian Chemical Bulletin, vol. 42, No. 12, Dec. 1993, pp. 2014-2017.
Yarovenko et al., "New Synthesis of 1,2,4-Oxadiazoles," Tetrahedron, vol. 46, No. 11, 1990, pp. 3941-3952.
Notice of Allowance and Fee(s) Due from U.S. Appl. No. 13/736,898 dated Jan. 13, 2014.
Advisory Action from U.S. Appl. No. 13/736,898 dated Dec. 9, 2013.
Final Office Action from U.S. Appl. No. 13/736,898 dated Jun. 24, 2013.
On line product catalog, down-loaded on Jun. 18, 2013, "Tri-Carb 2910 TR Liquid Scintillation Analyzer", PerkinElmer.
Notice of Allowance and Fee(s) Due from U.S. Appl. No. 13/439,780 dated Jul. 31, 2013.
Restriction/Election Requirement from U.S. Appl. No. 13/439,780 dated Mar. 28, 2013.
Notice of Allowance and Fee(s) Due from U.S. Appl. No. 13/439,780 dated Jun. 12, 2013.
Non-Final Office Action from U.S. Appl. No. 13/437,836 dated Nov. 7, 2013.
International Preliminary Report on Patentability from PCT application No. PCT/US2012/033449 dated Oct. 24, 2013.
Final Office Action from U.S. Appl. No. 13/437,836 dated May 22, 2014.
Notice of Allowance and Fee(s) Due from U.S. Appl. No. 13/477,910 dated Apr. 16, 2014.
Restriction/Election Requirement from U.S. Appl. No. 12/167,104 dated Jun. 8, 2011.
Non-Final Office Action from U.S. Appl. No. 12/167,104 dated Sep. 15, 2011.
Final Office Action from U.S. Appl. No. 12/167,104 dated Feb. 23, 2012.
Notice of Allowance and Fee(s) Due from U.S. Appl. No. 12/167,104 dated Jun. 21, 2012.
Udagawa et al., "Aberrant Porphyrin Metabolism in Hepatocellular Carcinoma," 1984 Academic Press, Inc., Biochemical Medicine, vol. 31, pp. 131-139.
Pitts et al., "Autofluorescene characteristics of immortalized and carcinogen-transformed human bronchial epithelial cells," 2001 SPIE, Journal of Biomedical Optics, vol. 6, No. 1, Jan. 2001, pp. 31-40.

(56) References Cited

OTHER PUBLICATIONS

Zawirska, B., "Comparative Porphyrin Content in Tumors with Contiguous Non-Neoplastic Tissues," 1979, Neoplasma, vol. 26, No. 2, pp. 223-229.
Malik et al., "Destruction of Erythroleukaemic Cells by Photoactivation of Endogenous Porphyrins," The Macmillan Press Ltd., 1987, Br. J. Cancer, 1987, vol. 56, pp. 589-595.
Zhang et al., "Far-red and NIR Spectral Wing Emission from Tissues under 532 and 632 nm Photo-excitation," 1999 OPA, Lasers in the Life Sciences, vol. 9, pp. 1-16.
Alfano et al., "Laser Induced Fluorescence Spectroscopy from Native Cancerous and Normal Tissue," 1984 IEEE, IEEE Journal of Quantum Electronics, vol. QE-20, No. 12, Dec. 1984, pp. 1507-1511.
Navone et al., "Heme Biosynthesis in Human Breast Cancer-Mimetic "In Vitro" Studies and Some Heme Enzymic Activity Levels," 1990 Pergamon Press Pic, International Journal on Biochemistry, vol. 22, No. 12, pp. 1407-1411.
Richards-Kortum et al., "Spectroscopic Diagnosis of Colonic Dysplasia," 1991 Pergamon Press Pic, Photochemistry and Photobiology, vol. 53, No. 6, pp. 777-786.
Demos et al., "Subsurface Imaging Using the Spectral Polarization Difference Technique and NIR Illumination," Part of the SPIE Conference on Optical Tomography and Spectroscopy of Tissue III, Jan. 1991, SPIE 3597, pp. 406-410.
Demos et al., "Tissue Imaging for Cancer Detection Using NIR Autofluorescence," 2002 SPIE, Optical Biopsy IV, Proceedings of SPIE, vol. 4613, pp. 31-34.
Corle et al., "Chapter 2—Instruments," Confocal Scanning Optical Microscopy and Related Imaging Systems, 1996, pp. 67-145.
Wang et al., "Morphological instability of crystals grown from thin aqueous solution films with a free surface," Philosophical Magazine A, 1995, vol. 71, No. 2, pp. 409-419.
Breukers et al., "Transparent lithium loaded plastic scintillators for thermal neutron detection," Nuclear Instruments and Methods in Physics Research A, vol. 701, 2013, pp. 58-61.
Britvich et al., "New Polystyrene-Based Scintillators," Instruments and Experimental Techniques, vol. 45, No. 5, 2002, pp. 644-654.
Brooks, F.D., "A Scintillation Counter with Neutron and Gamma-Ray Discriminators," Nuclear Instruments and Methods, vol. 4, 1995, pp. 151-163.
Bryan et al., "Fast Neutron—Gamma Pulse Shape Discrimination of Liquid Scintillation Signals for Time Correlated Measurements," 2003 IEEE Nuclear Science Symposium Conference Record, Oct. 19-25, 2003, pp. 1-5.
Fisher et al., "Fast neutron detection with 6Li-loaded liquid scintillator," Nuclear Instruments and Methods in Physics Research A, vol. 646, 2011, pp. 126-134.
Greenwood et al., "Li-Salicylate Neutron Detectors with Pulse Shape Discrimination," Nuclear Instruments and Methods 165, 1979, pp. 129-131.
Grudskaya, L.E., "Plastic Scintillators for Seperation of Particles by Pulse Shape," Monokristally I Tekhnika, vol. 3, 1968, pp. 153-156.
Im et al., "Scintillators for Alpha and Neutron Radiations Synthesized by Room Temperature Sol-Gel Processing," Journal of Sol-Gel Science and Technology, vol. 32, 2004, pp. 117-123.
Im et al., "Transparent matrix structures for detection of neutron particles based on di-ureasil xerogels," Applied Physics Letters, vol. 84, No. 13, 2004, pp. 2448-2450.
Im et al., "Transparent Solid-State Lithiated Neutron Scintillators Based on Self-Assembly of Polystyrene-block-poly (ethylene oxide) Copolymer Architectures," Advanced Material, vol. 16, No. 19, 2004, pp. 1757-1761.
Jhingan et al, "Simple Ways of n-y Discrimination Using Charge Comparison Technique," ScienceDirect, Nuclear Instruments and Methods in Physics Research A 585 (2008) 165-171.
Katagiri et al., "Neutron/y-ray discrimination characteristics of novel neutron scintillators," Nuclear Instruments and Methods in Physics Research A, vol. 529, 2004, pp. 317-320.
Kazkaz et al., "Comparison of Lithium Gadolinium Borate Crystal Grains in Scintillating and Nonscintillating Plastic Matrices," IEEE Transactions on Nuclear Science, vol. 60, No. 2, 2013, pp. 1416-1426.
Kesanli et al., "Highly efficient solid-state neutron scintillators based on hybrid sol-gel nanocomposite materials," Applied Physics Letters, vol. 89, 2006, pp. 214104/1-214104/3.
Lawrence Livermore National Laboratory, "Laboratory Directed Research and Development, FY2007 Annual Report".
Negina et al., "Plastic Scintillation of Increased Transparency Containing 6Li," Translated Sep.-Oct. 1980 from Pribory i Tekhnika Eksperimenta, No. 5, 1981, pp. 60-62.
Non-Final Office Action from U.S. Appl. No. 12/418,450, dated Jun. 14, 2012.
Sangster et al., "Study of Organic Scintillators," The Journal of Chemical Physics, vol. 24, No. 4, 1956, pp. 670-715.
Schomacker et al., "Ultraviolet Laser-Induced Fluorescence of Colonic Tissue: Basic Biology and Diagnostic Potential," Lasers in Surgery and Medicine 12, 1992, pp. 63-78.
Sellin et al., "Digital Pulse Shape Discrimination Applied to Capture-Gated Neutron Detectors," Department of Physics, University of Surrey, Guildford, UK, pp. 1-18.
Sen et al., "Polyester Composite Thermal Neutron Scintillation Films," IEEE Transactions on Nuclear Science, vol. 59, No. 4, 2012, pp. 1781-1786.
Soderstrom et al., "Digital Pulse-Shape Discrimination of Fast Neutrons and y Rays," ScienceDirect, Nuclear Instruments and Methods in Physics Research A 594, 2008, pp. 79-89.
Soderstrom, P., "Pulse Shape Discrimination Between Neutrons and Gamma Rays with Digital Electronics," Nuclear Structure Group, Department of Nuclear and Particle Physics, Uppsala University, pp. 1-27.
Demos, S.G., U.S. Appl. No. 11/292,406, filed Nov. 30, 2005.
Zaitseva et al., "Neutron detection with single crystal organic scintillators," SPIE Hard X-Ray, Gamma-Ray, and Neutron Detector Physics, Lawrence Livermore National Laboratory, Jul. 20, 2009, pp. 1-10.
Zaitseva et al., "Plastic scintillators with efficient neutron/gamma pulse shape discrimination," Nuclear Instruments and Methods in Physics Research A, vol. 668, 2012, pp. 88-93.
Non-Final Office Action from U.S. Appl. No. 13/601,918, dated Feb. 23, 2015.
Non-Final Office Action from U.S. Appl. No. 14/248,951, dated Jan. 20, 2015.
Non-Final Office Action from U.S. Appl. No. 13/471,259, dated Dec. 31, 2014.
Zaitseva et al., "Pulse shape discrimination with lithium-containing organic scintillators," Nuclear Instruments and Methods in Physics Research A, vol. 729, 2013, pp. 747-754.
Sen et al., "Thermal Neutron Scintillator Detectors Based on Poly (2-Vinylnaphthalene) Composite Films," IEEE Transactions on Nuclear Science, vol. 58, No. 3, Jun. 2011, pp. 1386-1393.

* cited by examiner

STRESS REDUCTION FOR PILLAR FILLED STRUCTURES

RELATED APPLICATIONS

This application claims priority to U.S. Provisional Application No. 61/589,771, filed Jan. 23, 2012, the contents of which are herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to the detection of particles, and more particularly to the detection of neutrons using thermal neutron converter materials in three dimensional high efficiency configurations and related methods.

BACKGROUND

Since neutrons have no charge and do not interact significantly with most materials, neutron converters are needed to react with neutrons to produce charged particles that can be easily detected by semiconductor devices to generate electrical signals.

Conventional $^3$He proportional tubes are simple neutron detectors that may achieve high thermal neutron detection efficiency. For example, a 2-inch diameter tube filled with 10 atm of $^3$He gas may reach 80% detection efficiency, although the detector normally operates at lower pressure settings thereby reducing the efficiency. Furthermore, the use of these proportional counter type devices is somewhat encumbered by the required high voltage operation (1000 V), sensitivity to microphonics, and high pressure; resulting in significant complications in routine deployment and air transport.

Solid state thermal neutron detection techniques generally utilize a planar semiconductor detector over which a neutron reactive film has been deposited. Upon a surface of the semiconductor detector is attached a coating that responds to ionizing radiation reaction products upon the interaction with a neutron. The ionizing radiation reaction products can then enter into the semiconductor material of the detector thereby creating a charge cloud of electrons and "holes," which can be sensed to indicate the occurrence of a neutron interaction within the neutron sensitive film. The charges are swept through such configured detectors via methods known by those of ordinary skill in the art and registered as an electrical signal.

Another geometry includes etched trenches, slots, or holes in semiconductor materials having dimensions on the micron scale or larger that are filled with predetermined converter materials and configured with electrodes so as to produce detectors similar to the planar detector geometries discussed above.

Conventional solid state radiation detectors, however, suffer from efficiency, flexibility and scalability issues.

SUMMARY

According to one embodiment, an apparatus for detecting neutrons includes an array of pillars, wherein each of the pillars comprises a rounded cross sectional shape where the cross section is taken perpendicular to a longitudinal axis of the respective pillar, a cavity region between each of the pillars, and a neutron sensitive material located in each cavity region.

According to another embodiment, an apparatus for detecting neutrons includes an array of pillars, wherein a separation between each of the pillars is about uniform, a cavity region between each of the pillars, and a neutron sensitive material located in the cavity region.

According to yet another embodiment, an apparatus for detecting neutrons includes a substrate, an array of pillars above the substrate, wherein each of the pillars has an upper portion and a lower portion, wherein the lower portion of each of the pillars is positioned towards the substrate, wherein the upper portion of each pillar has a smaller average diameter relative to an average diameter of the lower portion of the pillar where the diameters are oriented perpendicular to a longitudinal axis of the pillar, a cavity region between each of the pillars, and a neutron sensitive material located in the cavity region.

According to a further embodiment, an apparatus for detecting neutrons, includes an array of pillars, a cavity region between each of the pillars, a neutron sensitive material located in each cavity region, and a stress-reducing layer coating at least a portion of each of the pillars and positioned between the pillars and the neutron sensitive material, wherein the stress-reducing layer at least partially counteracts a tensile and/or compressive stress exerted on the pillars by the neutron sensitive material.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

DETAILED DESCRIPTION

Figure 1B:
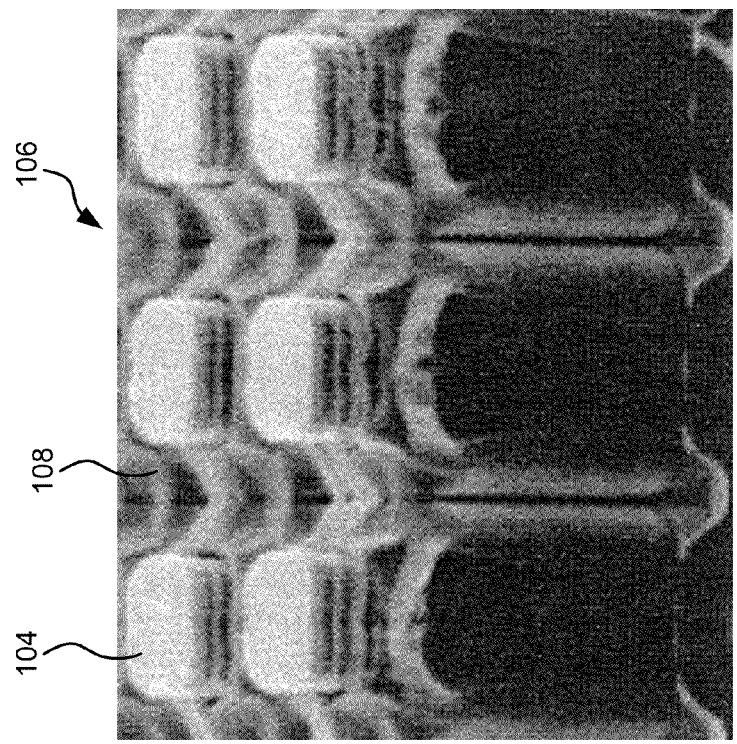
FIG. 1B shows a schematic of a structure including an array of three dimensional high aspect ratio pillars with a neutron sensitive material located in cavity regions between each of the pillars, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of neutron radiation detection using thermal neutron converter materials in three dimensional high efficiency configurations and/or related systems and methods.

In one general embodiment, an apparatus for detecting neutrons includes an array of pillars, wherein each of the pillars comprises a rounded cross sectional shape where the cross section is taken perpendicular to a longitudinal axis of the respective pillar, a cavity region between each of the pillars, and a neutron sensitive material located in each cavity region.

In another general embodiment, an apparatus for detecting neutrons includes an array of pillars, wherein a separation between each the pillars is about uniform, a cavity region between each of the pillars, and a neutron sensitive material located in the cavity region.

In yet another general embodiment, an apparatus for detecting neutrons includes a substrate, an array of pillars above the substrate, wherein each of the pillars has an upper portion and a lower portion, wherein the lower portion of each of the pillars is positioned towards the substrate, wherein the upper portion of each pillar has a smaller average diameter relative to an average diameter of the lower portion of the pillar where the diameters are oriented perpendicular to a longitudinal axis of the pillar, a cavity region between each of the pillars, and a neutron sensitive material located in the cavity region.

In a further general embodiment, an apparatus for detecting neutrons, includes an array of pillars, a cavity region between each of the pillars, a neutron sensitive material located in each cavity region, and a stress-reducing layer coating at least a portion of each of the pillars and positioned between the pillars and the neutron sensitive material, wherein the stress-reducing layer at least partially counteracts a tensile and/or compressive stress exerted on the pillars by the neutron sensitive material.

Three dimensional high aspect ratio pillars with a neutron sensitive material located in cavity regions between the pillars may be designed to decouple physical parameters by using two or more distinct materials. For example, one material may comprise the pillar material (e.g. silicon), which may act as a charge collecting media. Additionally, a second material may comprise a neutron sensitive material (e.g. Boron-10), which may absorb and/or interact with ionizing or non-ionizing matter (e.g. neutrons, gamma rays, x-rays etc).

In some instances, these three dimensional pillars may suffer from stress, such as a tensile and/or compressive stress, due to the physical contact between the neutron sensitive material and the pillars. The stress may lead to delamination of the neutron sensitive material, cracking of the pillars and unwanted electrical changes within the pillars. Consequently, embodiments of the present invention are directed to provide various structures, methods, etc. to reduce said stress. For instance, some exemplary approaches to alleviate the stress may include: modifying the shape, arrangement and geometry of the pillars; depositing a stress-reducing layer with an opposite polarity of stress as compared to the pillars, e.g. a stress-reducing layer having a compressive stress to compensate a tensile stress of the pillars, a stress reducing layer having a tensile stress to compensate a compressive stress of the pillars, or any combination thereof; depositing a sacrificial layer on the pillars; inclusion of dopants in the pillars and/or neutron sensitive material; altering and/or controlling the quantity of neutron sensitive material deposited in the cavity regions, etc.

Figure 1A:
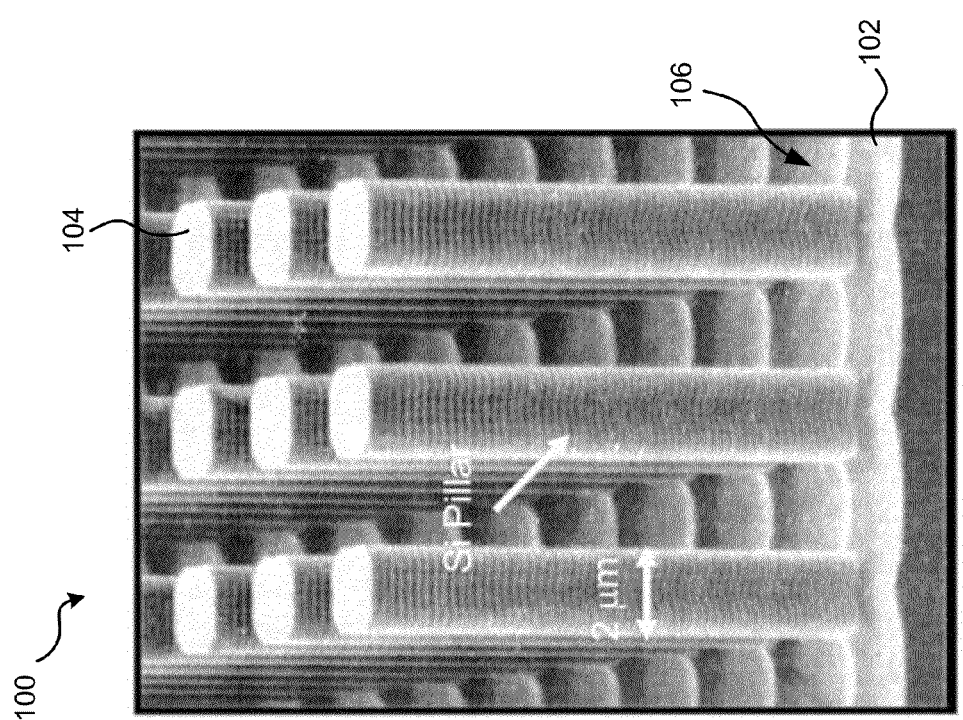
FIG. 1A shows a schematic of a structure including an array of three dimensional high aspect ratio pillars with cavity regions etched between each of the pillars, according to one embodiment.

FIGS. 1A and 1B depict structures 100 including a three dimensional array of high aspect ratio pillars, in accordance with one embodiment. As an option, the present structures 100 may be implemented in conjunction with features from any other embodiment listed herein, such as those described with reference to the other FIGS. Of course, however, such structures 100 and others presented herein may be used in various applications and/or in permutations, which may or may not be specifically described in the illustrative embodiments listed herein.

As shown in FIG. 1A according to one approach, a substrate 102 is etched to form an array of pillars 104 with cavity regions 106 between each of the pillars. The substrate may include, but is not limited to, a semiconductor material, silicon, quartz, etc. or other suitable substrates as would be understood by one skilled in the art upon reading the present disclosure.

In some approaches, an upper portion of each of the pillars 104 may include a p+ layer (not shown in FIG. 1A), where the upper portion of each of the pillars 104 is positioned away from the substrate 102. In additional approaches, the substrate 102 may serve as an n+ layer, such that the array of pillars on the substrate forms a p-i-n diode array. A high doping layer may be applied to cover the top layer of the pillars, and/or to cover all surfaces of the pillars, etc., in various approaches.

As depicted in FIG. 1B, a neutron sensitive material 108 is deposited in the cavity regions 106 between each pillar 104 in the array. The neutron sensitive material 108 may be an atomic or molecular medium, a polymer, semiconductor, dielectric, etc. In preferred embodiments, the neutron sensitive material 108 is Boron-10 ($^{10}$B).

A second material, not shown in FIG. 1B, may also fill the cavity regions 106. In some approaches, the second material may provide stability for the array and may or may not be active in terms of the functionality of the pillar array (e.g. with regard to neutron detection). For example, the second material may include a non-rigid material, a polymer, etc.

The structure 100 may also include a coating of a functional or support material (not shown in FIG. 1A or 1B) deposited on the bottom surface of the substrate 102 and/or atop the pillar array. As an example, this coating may be metallic to form electrical contacts, e.g. electrodes, to serve as a sensor or detector. For instance, in one approach, aluminum may be sputtered on the bottom surface of the substrate 102 and/or atop the pillar array to form the electrodes.

Figure 2:
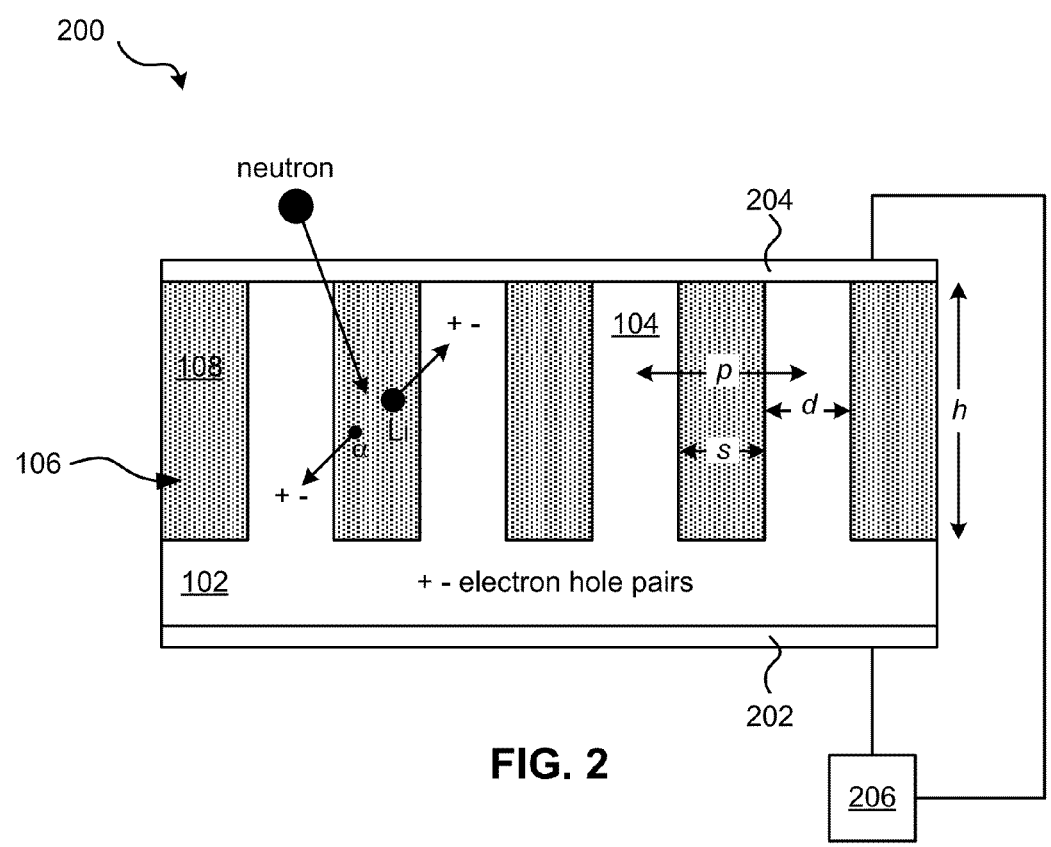
FIG. 2 shows a schematic of a thermal neutron detector including a three dimensional array of high aspect ratio pillars, according to one embodiment.

Additionally, a structure comprising a three dimensional array of high aspect ratio pillars may be included in a neutron detector 200, as shown in FIG. 2 per another embodiment. The neutron sensitive material 108 (e.g. $^{10}$B) deposited in the cavity regions 106 between the pillars 104 may possess a relatively high cross section for thermal neutron interactions. For instance, interaction between a neutron and the neutron sensitive material (e.g. $^{10}$B) results in the generation of alpha and $^7$Li particles. These particles subsequently interact with the pillars (e.g. composed of Si) to produce electron-hole pairs. A voltage may then be applied to a pair of electrodes 202, 204 coupled to the upper and/or lower surfaces of the detector 200 to promote the collection of the electrical signals generated by the electron-hole pairs. Processing hardware 206 of a type known in the art may be coupled to the electrodes 202, 204 for detecting, processing, etc. the electrical signals generated by the neutron interaction with neutron sensitive material 108. Any known detector components (e.g. pre-amplifiers, amplifiers, multi-channel analyzers, computers, etc.) may be used in combination with the novel structures presented herein to create neutron detectors, according to various embodiments.

In various approaches, the pillars 104 may have a high aspect ratio, thus the effect of neutron streaming through the pillars without passing through the neutron sensitive material is negligible, e.g. less than about 1%. For example, the aspect ratio of the pillars 104, defined as the ratio of the height of the pillars relative to its width and/or pitch, may be in a range of about 1:1 to about 1000:1 or higher, e.g., about 1:1, about 10:1, about 25:1, about 50:1, and about 100:1.

With continued reference to FIG. 2, each of the pillars 104 in the array may also have a diameter, d, of about 0.5 to about 5 μm in some approaches. In addition, each of the pillars may have a pitch, p, of about 2 to about 10 μm and a height (e.g. an etch depth), h, of about 2 to about 100 μm, e.g., about 4 μm, about 10 μm, about 12 μm, about 20 μm, about 50 μm, or about 100 μm, in more approaches. Further, the separation, s, between adjacent pillars may be in a range from about 1 μm to about 10 μm. It is important to note, however, that said pillar dimensions (diameter, pitch, height, aspect ratio, etc.) serve only as an example and are not limiting in any way, and various embodiments may have larger or smaller dimensions.

Furthermore, in exemplary approaches, the detector 200 including the three dimensional array of high aspect ratio pillars may offer various advantages over conventional neutron detectors, such as $^3$He tubes and two dimensional solid-state thermal detectors. For example, the detector 200 may be capable of operating at a low voltage (e.g. less than about 5V); may be insensitive to vibrations and consequently well suited for handheld deployment/use; may achieve a high thermal neutron detection efficiency (e.g. greater than about 50%); may substantially discriminate between neutron and gamma ray measurement signals, preferably achieving a gamma discrimination of about $10^5$; may be cost effective to fabricate/produce; may comprise a compact size, e.g. 1×1×0.1 cm$^3$, etc.

Figure 3:
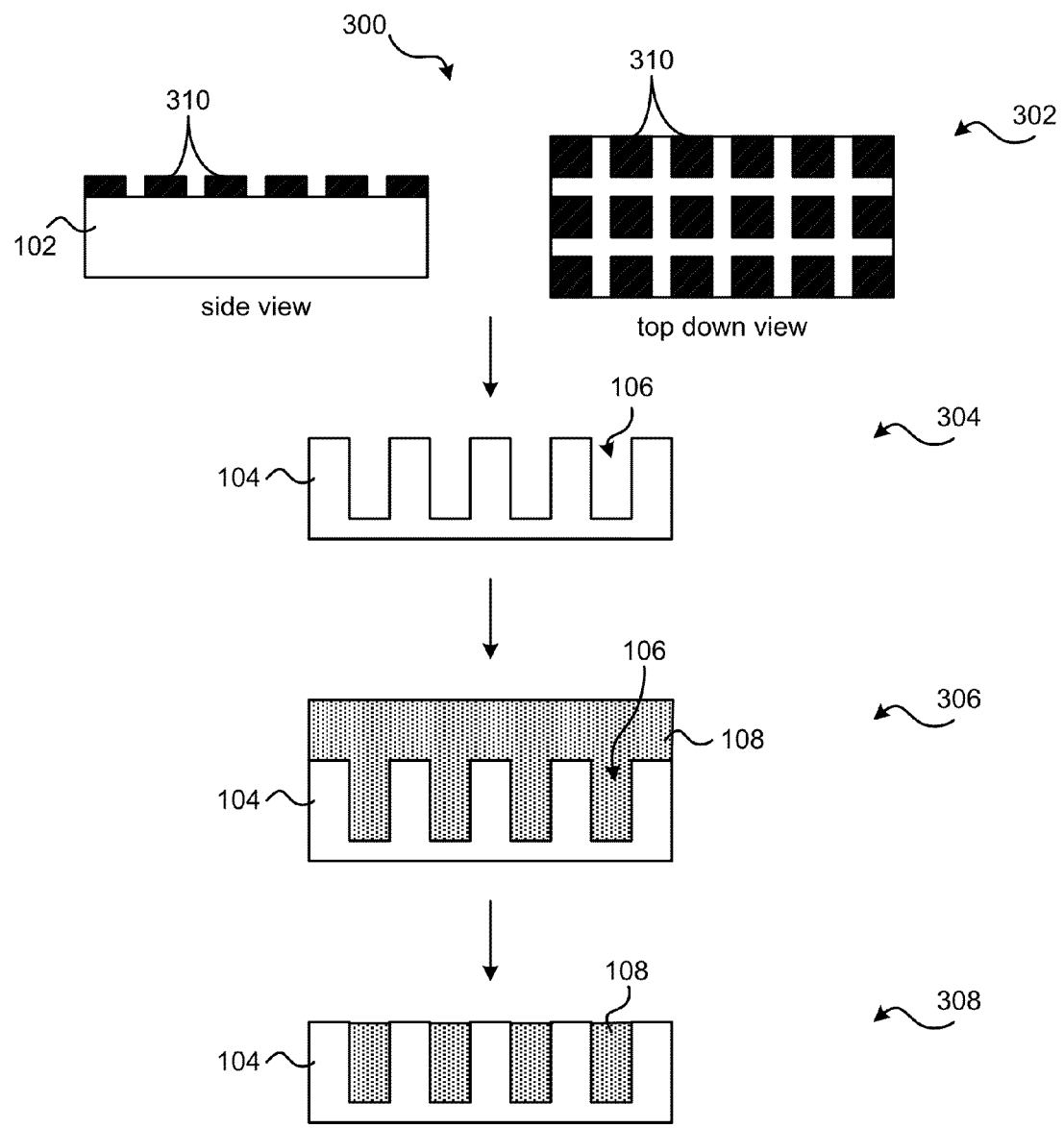
FIG. 3 shows a flowchart of a method for fabricating a three dimensional array of high aspect ratio pillars, according to one embodiment.

Referring now to FIG. 3, a method 300 for fabricating an array of pillars that may form the support structure of a sensor, such a thermal neutron detector, is shown according to yet another embodiment. As an option, the present method 300 may be implemented in conjunction with features from any other embodiment listed herein, such as those described with reference to the other FIGS. Of course, however, such method 300 and others presented herein may be used in various applications and/or in permutations, which may or may not be specifically described in the illustrative embodiments listed herein. Moreover, more or less operations than those shown in FIG. 3 may be included in method 300, according to various embodiments. Furthermore, while exemplary processing techniques are presented, other known processing techniques may be used for various steps.

As shown in FIG. 3 according to one approach, a photolithographic mask 310 is applied to a substrate 102. The substrate 102 is then etched to form an array of pillars 104, with the array pattern defined by the photolithographic mask 310. See transition from structure 302 to structure 304. Etching the substrate 102 may include such techniques as dry etching by high density plasma (e.g. reactive ion etching), wet etching with or without using a surfactant, etc. Additionally, if the substrate 102 has been etched using a high density plasma etch, an optional step may include further wet etching the pillar surfaces using a surfactant or other etches that etch silicon in order to remove any plasma etch damage. Surfactants used during the wet etching may include ammonium fluoro alkyl sulfonamide in water or potassium hydroxide with isopropyl alcohol.

After the pillars have been formed, a neutron sensitive material 108 is deposited into the cavity regions 106 between each of the pillars 104 resulting in structure 306. The neutron sensitive material 108 may be deposited via chemical vapor deposition (CVD), solution, nanoparticle based approaches, etc. according to various embodiments.

Overfilling the pillar array such that a large amount of the neutron sensitive material 108 is deposited on the pillars 104, may cause substantial stress in the pillar array, may cause delamination of the neutron sensitive material 108, cracking of the pillars and unwanted electrical changes in the pillars that may give rise to leakage current. Thus, in numerous approaches, the deposition of the neutron sensitive material 108 may be stopped such that the pillar structures are underfilled. Consequently, the neutron sensitive material 108 may not completely fill the cavity regions 106, thereby defining gaps in the cavity regions 106 that are not filled with the neutron sensitive material 108, in some approaches. Further, said gaps between the neutron sensitive material 108 and at least an upper portion of each pillar (e.g. the region positioned away from the substrate 102) may exhibit a physical characteristic of reducing a stress (e.g. a tensile and/or compressive stress) of the pillar array in more approaches.

In yet another approach, the neutron sensitive material 108 may have a dopant or additional element (designating a higher concentration) therein, e.g. an additive, where the dopant has a physical characteristic of modifying, and preferably reducing a stress, e.g. a tensile and/or compressive stress, of the neutron sensitive material 108. For example, the dopant may modify the stress by changing the bonding configuration of the neutron sensitive material 108 in some approaches. The dopant may include, but is not limited to, nitrogen, oxygen, carbon, hydrogen or other such suitable dopants as would be understood by one skilled in the art.

A second material may be optionally deposited in the above mentioned gaps to provide support to the pillar structure, in a further approach. Preferably, this second material may not impart significant additional stress to the pillar array. This second material may be, for example, a non-rigid material, a polymer, etc. In preferred embodiments, the second material may be different from the material of the pillars 104 and/or the neutron sensitive material 108. In addition, the second material may be deposited via chemical vapor deposition, spin coating, etc.

With continued reference to FIG. 3, the neutron sensitive material 108 extending above the pillars 104 is etched back so that at least a section of an upper portion of the pillars 104 is exposed, where the upper portion of each of the pillars is positioned away from the substrate. See resulting structure 308. Etching back the neutron sensitive material 108 may be achieved using such techniques as plasma beam etching, ion beam etching, lapping, applying an adhesive to delaminate or "tear off" the top layer, etc. In various approaches, after etching back the neutron sensitive material 108, the thickness of the remaining neutron sensitive material 108 may be less than or equal to the height of the pillars 104, where the thickness of the neutron sensitive material is measured parallel to the longitudinal axis of the respective material. For example is some approaches, the thickness of the neutron sensitive material 108 may be between about 2 μm to 100 μm, e.g. about 50 μm, etc.

As mentioned above, the photolithographic mask defines the geometry, arrangement and shape of each of the pillars 104 on the substrate 102. For example, as shown in FIGS. 10A-G according to some embodiments, illustrative cross sectional shapes of the pillars 104 as each one would be seen if viewed in cross section along a plane (denoted by line 10A') oriented perpendicular to its longitudinal axis (z) may include, but is not limited to, a square (FIG. 10B), octagon (FIG. 10C), hexagon (FIG. 10D), star (FIG. 10E), triangle (FIG. 10F), circle (FIG. 10G), etc., or other such suitable shapes. However, pillars with cross sectional shapes having sharp corners (e.g. square, octagon, star, triangle etc.) may create high stress fields, which, when coupled with the stress induced from the neutron sensitive material deposited in the cavity regions, may cause the pillars to crack in some approaches. In addition, the deposition rate of a neutron sensitive material such as $^{10}B$ may be faster on flat edges than corners, creating further areas of stress in other approaches. Therefore, in preferred embodiments, each of the pillars may comprise a rounded cross sectional shape, where, as mentioned above, the cross section is taken perpendicular to a longitudinal axis. In further preferred embodiments, the rounded cross sectional shape of each of the pillars may be at least one of circular and ellipsoid. The rounded cross sectional shape of each of the pillars 104 may also have a physical characteristic of reducing a tensile and/or compressive stress associated with pillar array according to other exemplary approaches.

In some approaches, a pillar with a rounded cross sectional shape may be formed using a lithographic mask with the rounded feature therein. Alternatively, in other approaches, the lithographic mask may contain sharp corners thereby producing pillars with sharp corners that may subsequently be rounded, e.g., by overexposure during the lithographic exposure step, photoresist reflow, wet etching or plasma etching, etc.

Figure 4B:
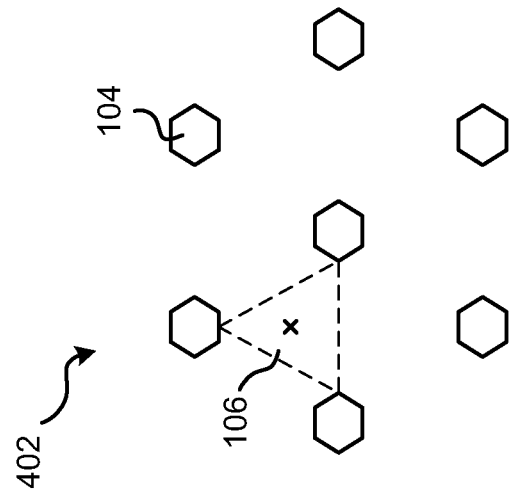
FIG. 4B shows a schematic of a hexagonally close packed array, according to one embodiment.
Figure 4A:
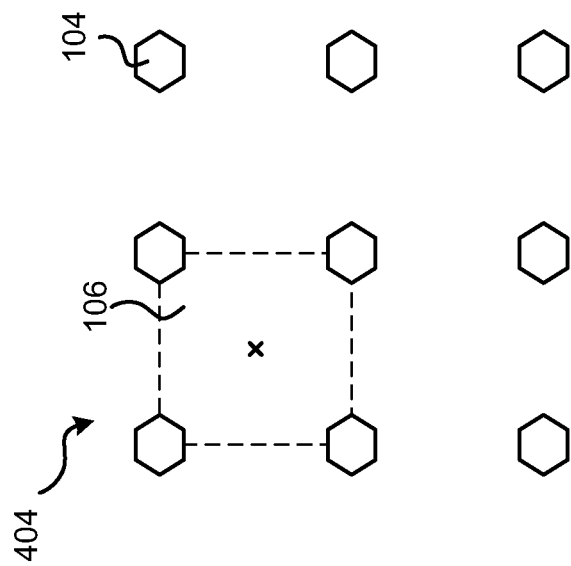
FIG. 4A shows a schematic of a square packed pillar array, according to one embodiment.

Additionally, it may be preferable to achieve a high fill factor of the neutron sensitive material 108 within the array of pillars. However, where the neutron sensitive material 108 is deposited in the cavity regions 106 using a conformal coating method such as chemical vapor deposition, areas of the array may fill faster or slower than others, leading to areas having more or less neutron sensitive material relative to the other areas. This partial filling mechanism may be another source of stress formation within the array of pillars. Thus, in a preferred embodiment, the pillars may be arranged in the array such that a separation between each of the pillars is about uniform. For instance, in one approach, the array of pillars may be arranged in a hexagonally close packed (HCP) array 402 as shown in FIG. 4B. With a HCP array 402, the cavity regions 106 between each pillar 104 may be conceptually thought of as sections each having a generally triangular cross sectional shape. An HCP array 402 may provide a lower stress configuration than a square array 404 in exemplary approaches. Again, in some approaches, this reduction in stress may be because the distance from one pillar to the next is more uniform for the HCP array 402 than the square array 404, shown in FIG. 4A, and because there is less of a gap in the center of the cavity regions 106 (represented as an "x" in FIGS. 4A and 4B) of the HCP array 402 than the square array 404.

Figure 5:
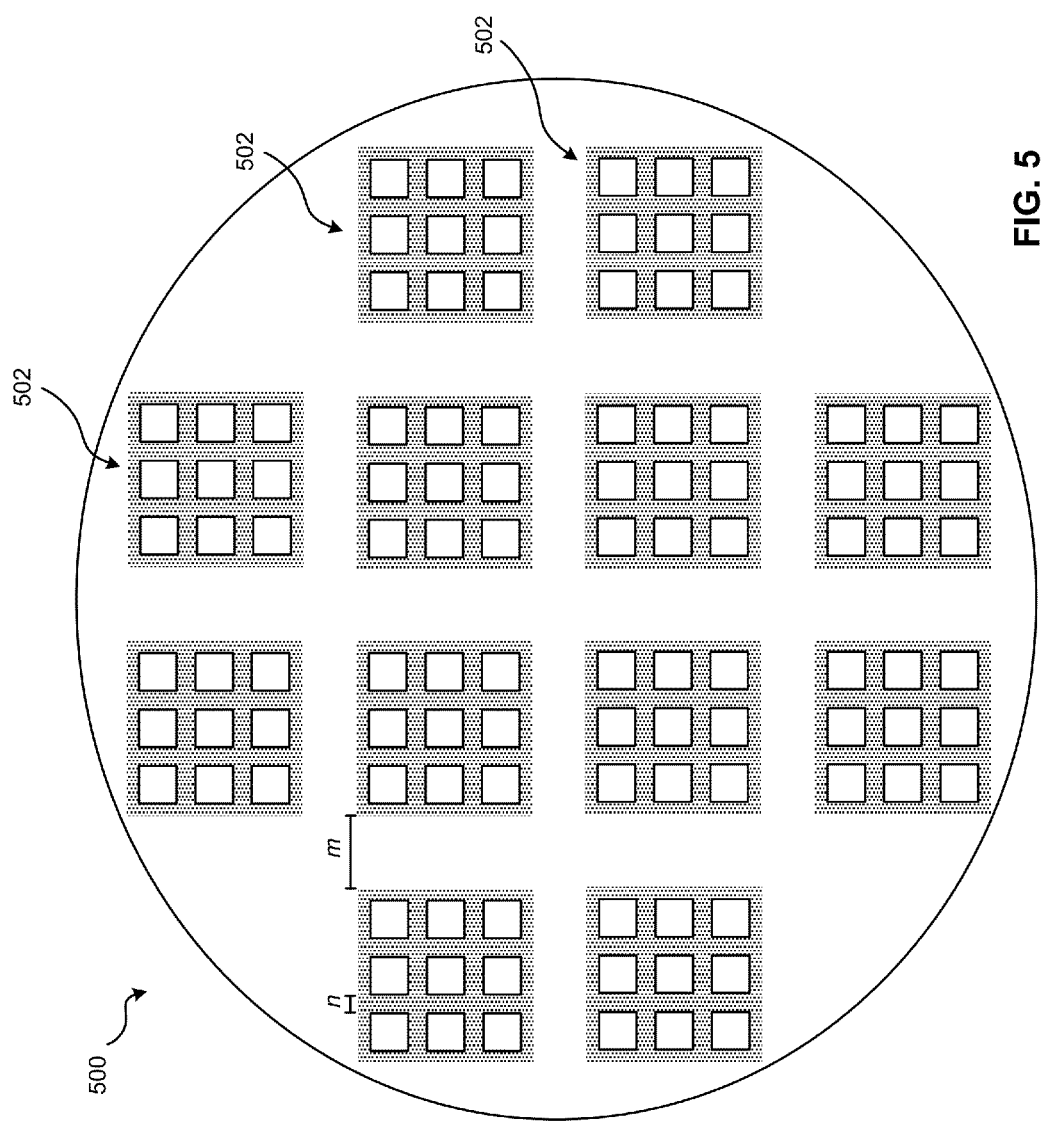
FIG. 5 shows a schematic of a structure including a segmented array of pillars, according to one embodiment.

Referring now to FIG. 5, a structure 500 including a segmented array of pillars is shown according to a further embodiment. As an option, the present structure 500 may be implemented in conjunction with features from any other embodiment listed herein, such as those described with reference to the other FIGS. Of course, however, such structure 500 and others presented herein may be used in various applications and/or in permutations, which may or may not be specifically described in the illustrative embodiments listed herein.

As shown in FIG. 5 according to one approach, an array of pillars is segmented into discrete segments 502 of the pillars, where the average distance, n, between adjacent pillars in each of the segments 502 is less than an average distance, m, between adjacent segments 502. According to some embodiments, the size of each of the segments may be less than a crack domain size of 50-500 microns, where the domain size is defined as the diameter of a region with no cracked boron. By limiting the area of continuous pillars (e.g. the segments) to less than the crack domain size, the deleterious effects of stress (pillar cracking, delamination of the neutron sensitive material, etc.) may be avoided in various approaches.

According to some approaches the average distance, n, between adjacent pillars in each of the segments 502 may be in a range of about 1 μm to about 6 μm. In other approaches the cross sectional area of each of the segments 502 may be in a range between about 0.1 mm$^2$ to about 10 cm$^2$, or higher, where the cross sectional area is taken perpendicular to a longitudinal axis of the pillars in the respective segments. In even more approaches, a peripheral shape of the discrete segments 502 of pillars may be square, rectangular, rounded, ellipsoid, etc. and combinations of differing shapes.

Figure 6:
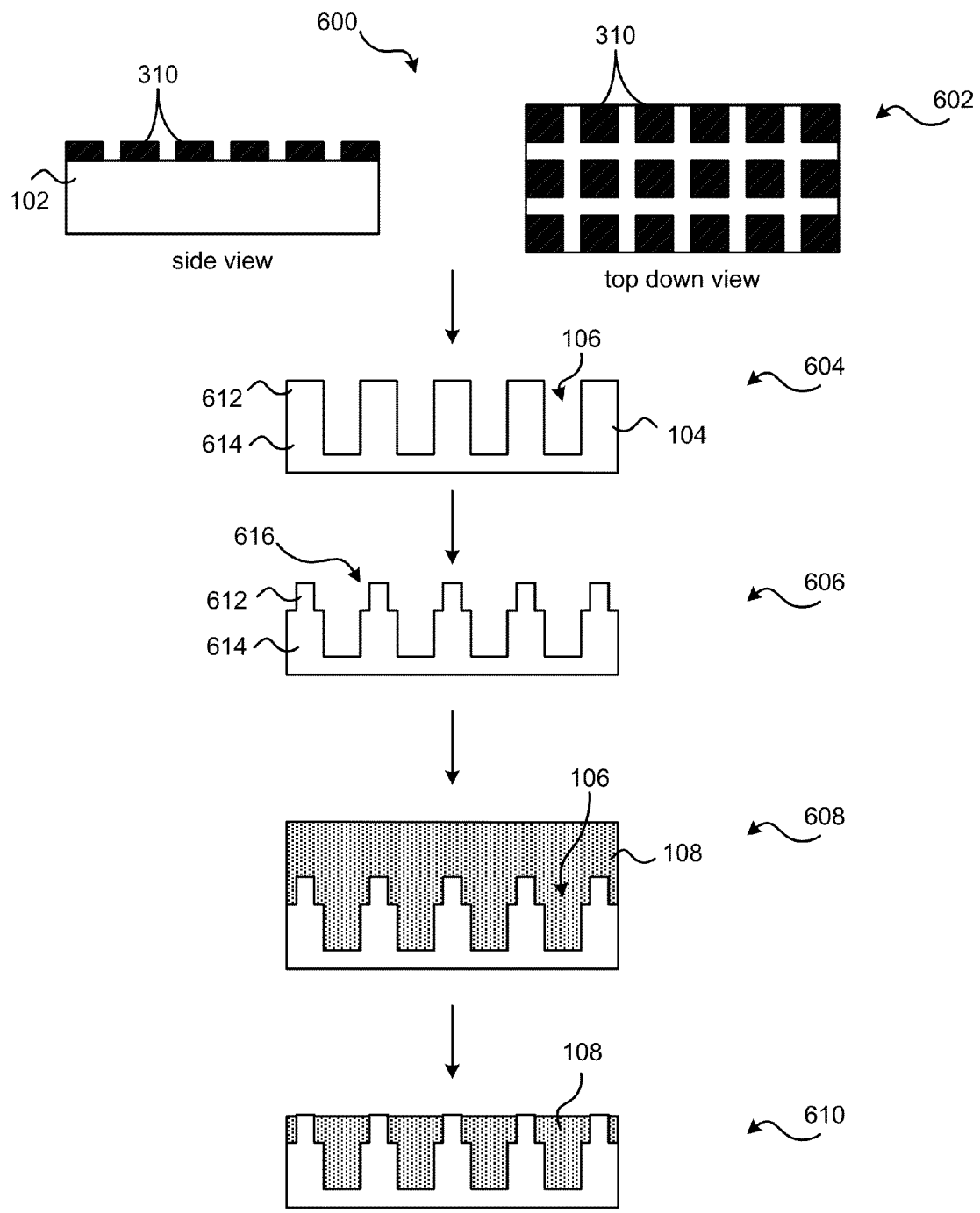
FIG. 6 shows a flowchart of a method for fabricating a three dimensional array of high aspect ratio pillars, according to one embodiment.

Now referring to FIG. 6, a method 600 for fabricating an array of pillars where each pillar has a tapered profile 616, is shown according to one embodiment. As an option, the present method 600 may be implemented in conjunction with features from any other embodiment listed herein, such as those described with reference to the other FIGS. Of course, however, such method 600 and others presented herein may be used in various applications and/or in permutations, which may or may not be specifically described in the illustrative embodiments listed herein. Moreover, more or less operations than those shown in FIG. 6 may be included in method 600, according to various embodiments. Furthermore, while exemplary processing techniques are presented, other known processing techniques may be used for various steps.

As shown in FIG. 6 according to one approach, a substrate 102 is etched to form an array of pillars 104 and cavity regions 106, with the array pattern defined by a photolithographic mask 310. See the transition from structure 602 to structure 604. Etching the substrate 102 may include such techniques as, dry etching by high density plasma (e.g. reactive ion etching), wet etching using a surfactant, etc. Additionally, if the substrate 102 has been etched using a high density plasma etch, an optional step may include further wet etching the pillar surfaces using a surfactant in order to achieve an isotropic etch and reduce plasma etch damage. Surfactants used during the wet etching may include ammonium fluoro alkyl sulfonamide in water, which may be used to lower the surface tension of the mixture making the solution wettable to silicon, or other suitable surfactant(s) as would be understood by one having skill in the art upon reading the present disclosure.

As shown in FIG. 6, each pillar 104 in the array has an upper portion 612 and a lower portion 614, where the lower portion of each of the pillars is positioned towards the substrate 102. After the pillars 104 have been formed, the upper portions 612 of the pillars 104 are etched to reduce the average diameters thereof, resulting in structure 606. Etching the upper portions 612 of the pillars 104 may involve wet etching without use of a surfactant. In some approaches, the wet etchant may be a silicon etchant, a mixture of hydrofluoric acid, nitric acid and acetic acid, etc. An illustrative etch rate may be in a range between about 500 Å/min to about 1500 Å/min.

In some approaches, application of a wet chemical etchant on the pillars 104 without a surfactant to wet the surface of the pillars may only isotropically wet etch the entrance (e.g. the upper portion 612) of the pillars. In more embodiments, the wet etch may be confined to the upper portions 612 of the pillars 104 by adjusting the concentrations and temperature of the wet etchant. Additionally, at least the upper portions 612 of the pillars 104 may include dopants (e.g. boron, phosphorus, arsenic, etc.) therein, which may modify the etch rate and/or aid in confining the etching to specific portions of the pillars 104. For example, in numerous approaches, the dopant may have a physical characteristic of increasing an etch rate of the upper portion 612 of the pillars 104.

As a result of the etching, the upper portion 612 of each pillar 104 may have a smaller average diameter relative to an average diameter of the lower portion 614 of the pillar 104 according to one approach, where diameters are oriented perpendicular to a longitudinal axis of the pillar 104. Further, the diameter of each lower portion 614 and the diameter of each upper portion 612 may be about constant along the longitudinal axis of the associated pillar 104 in yet another approach.

Referring to structure 608, a neutron sensitive material 108 is deposited into the cavity regions 106 between each of the pillars 104. The neutron sensitive material 108 extending above the pillars is etched back so that at least a section of an upper portion of the pillars 104 is exposed, resulting in structure 610. Etching back the neutron sensitive material 108 may be achieved using such techniques as plasma beam etching, ion beam etching, lapping, etc. In various embodiments, after etching back the neutron sensitive material 108, the thickness of the remaining neutron sensitive material 108 may be greater than, equal to or preferably less than the height of the pillars 104, where the thickness of the neutron sensitive material is measured parallel to the longitudinal axis of any of the pillars.

The tapered profile 616 of the pillars, where the average diameters of the upper portions 612 of the pillars 104 are less than the average diameters of the lower portions 614 of the pillars 104, may facilitate, allow, etc. a substantially conformal coating of the neutron sensitive material 108 in the cavity regions 106 without "over-filling." Over-filling occurs when there is buildup of material near the upper portions 612 of the pillars 104. Such over-filling may cause additional strain and stress in the array of pillars in some approaches. Thus, pillars 104 with a tapered profile 616 may have a physical characteristic of reducing a stress, e.g. a tensile and/or compressive stress, associated with the array of pillars. Moreover, such overfilling may result in closure of the cavity region near the upper portions 612 of the pillars, thereby preventing complete filling of the cavity regions 106 along the lower portions 614 of the pillars 104.

Figure 7:
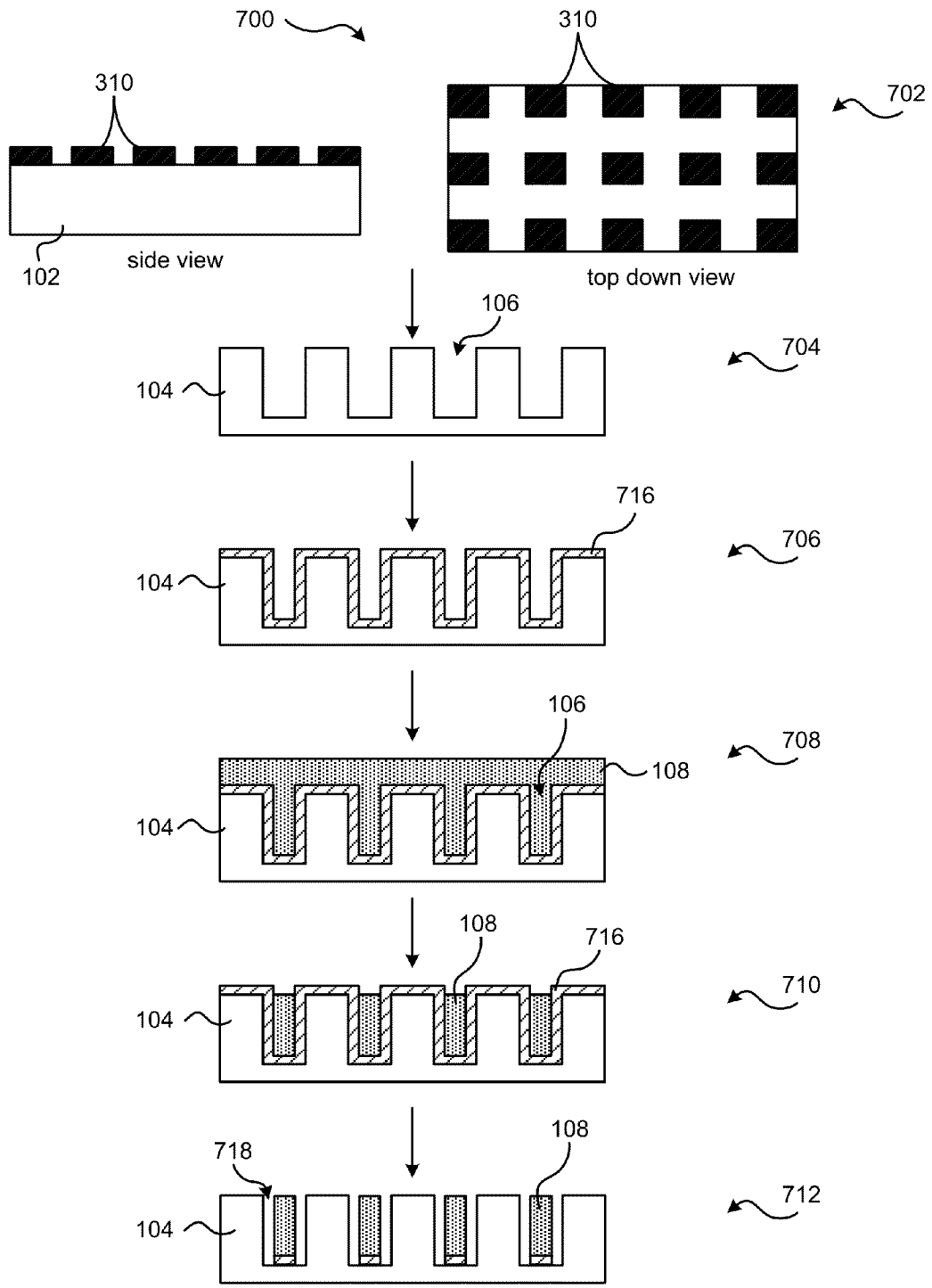
FIG. 7 shows a flowchart of a method for fabricating a three dimensional array of high aspect ratio pillars, according to one embodiment.

Referring now to FIG. 7, a method 700 for fabricating an array of pillars is shown according to one embodiment. As an option, the present method 700 may be implemented in conjunction with features from any other embodiment listed herein, such as those described with reference to the other FIGS. Of course, however, such method 700 and others presented herein may be used in various applications and/or in permutations, which may or may not be specifically described in the illustrative embodiments listed herein. Moreover, more or less operations than those shown in FIG. 7 may be included in method 700, according to various embodiments. Furthermore, while exemplary processing techniques are presented, other known processing techniques may be used for various steps.

As shown in FIG. 7 according to one approach, a substrate 102 is etched to form an array of pillars 104 and cavity regions 106, with the array pattern defined by a photolithographic mask 310. See the transition from structure 702 to structure 704. Etching the substrate 102 may include such techniques as, dry etching by high density plasma (e.g. reactive ion etching), wet etching using a surfactant which may allow a wettable surface due to lowered surface tension, etc. Additionally, if the substrate 102 has been etched using a high density plasma etch, an optional step may include further wet etching the pillar surfaces using a surfactant in order to remove any plasma etch damage. Surfactants used during the wet etching may include ammonium fluoro alkyl sulfonamide in water, in some approaches.

After the pillars have been formed, a sacrificial layer 716 may be applied and/or deposited on the pillars 104 resulting in structure 706. The sacrificial layer 716 may be deposited on and/or applied to the pillars 104 via numerous techniques, including but not limited to chemical vapor deposition, dry or wet oxidation, atomic layer deposition, etc.

In one embodiment the sacrificial layer may have a thickness in a range of about 500 Å to about 2000 Å, but could be higher or lower. In another embodiment, the sacrificial layer 716 may include an oxide, $SiO_2$, etc. In yet another embodiment, the sacrificial layer 716 may be chosen based on its ability to be selectively etched by various etchants. For instance, the sacrificial layer 716 may be selected such that an etching process, e.g. wet etching, may selectively etch the sacrificial layer material without etching the pillar material and/or neutron sensitive material.

Referring to structure 708, a neutron sensitive material 108 is deposited into the cavity regions 106 over the sacrificial layer 716. In one approach, the neutron sensitive material 108 may include Boron-10 ($^{10}B$), which has a very high thermal neutron cross section of 3837 barns. An upper portion of the neutron sensitive material 108 extending above the pillars is then removed to expose a portion of the sacrificial layer 716, as shown in structure 710. In various approaches, after etching back the neutron sensitive material 108, the thickness of the remaining neutron sensitive material 108 may be greater than, less than or equal to the height of the pillars 104, where the thickness of the neutron sensitive material 108 is measured parallel to the longitudinal axes of the pillars 104.

After removing the upper portion of the neutron sensitive material 108, an etchant is applied to substantially remove the sacrificial layer 716, preferably at least 90% thereof by volume. See resulting structure 712. The wet etchant may be chosen based on its ability to selectively etch the sacrificial layer while not affecting (i.e. etching) the pillar material or neutron sensitive material. For example, the etchant may include a buffered oxide etch (BOE)/HF (with or without a surfactant) solution in some approaches.

After application of the etchant to substantially remove the sacrificial layer 716, a spacing 718 may be present between the pillars 104 and the neutron sensitive material 108. In preferred embodiments, the spacing may be empty and have physical characteristics of a previously-present sacrificial layer 716 that has been removed after formation of the neutron sensitive material 108 in the cavity 106. Typically, stress associated with the array of pillars may arise due to the large internal stress of the neutron sensitive material 108, such as $^{10}B$, which may then transfer to the pillars 104 because of the contact between the pillars 104 and the neutron sensitive material 108. Consequently, the spacing 718 may remove the source of the stress from the pillars 104 in various approaches. Additionally, the array of pillars may retain, trap, store etc. electrical charge due to the contact between the neutron sensitive material 108 and the pillars 104, thus the spacing 718 may reduce the capacitance (e.g. the ability to store charge) associated with the array of pillars.

Figure 8:
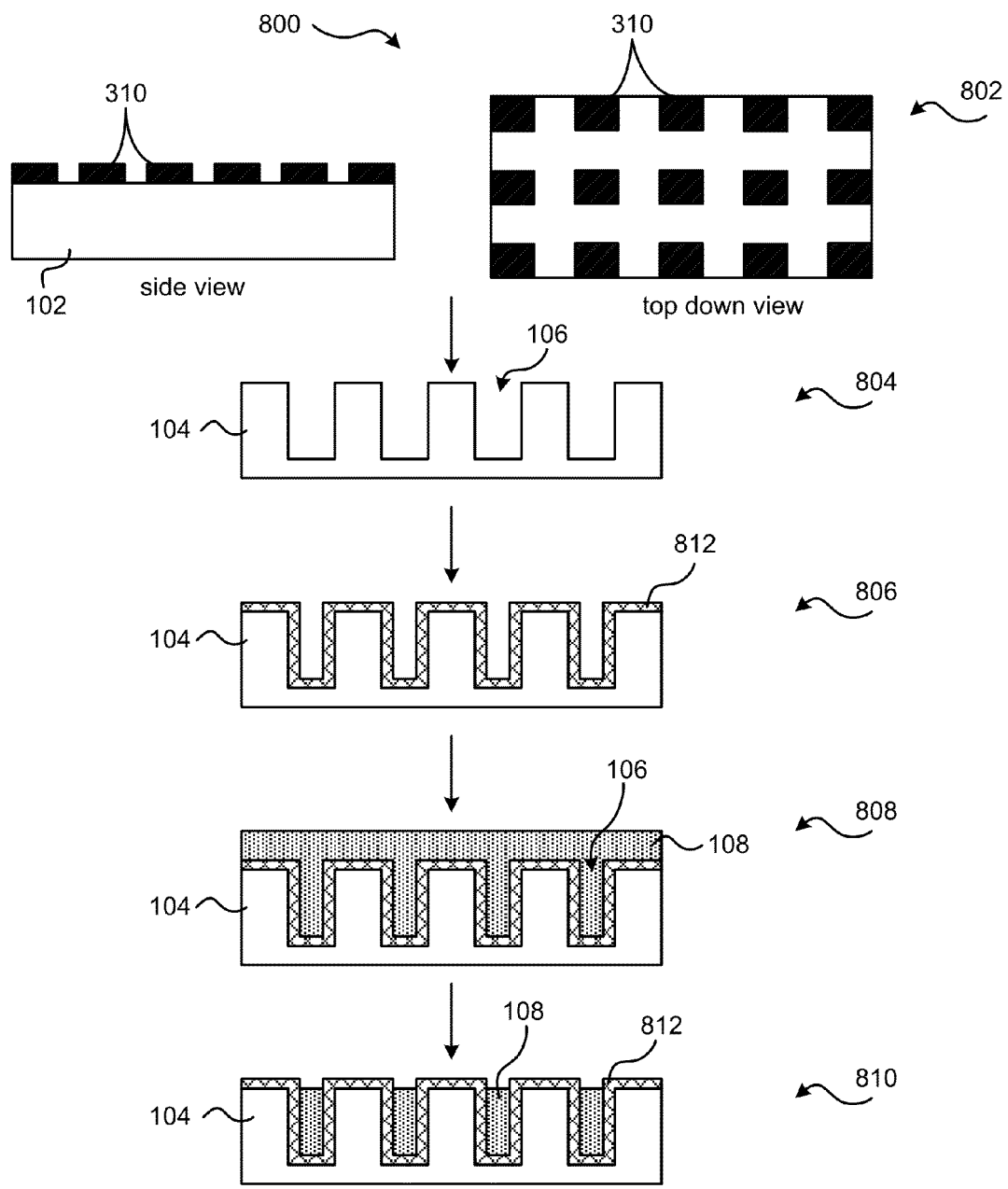
FIG. 8 shows a flowchart of a method for fabricating a three dimensional array of high aspect ratio pillars, according to one embodiment.

Referring now to FIG. 8, method 800 for fabricating an array of pillars that may form the support structure of a sensor, such a thermal neutron detector, is shown according to yet another embodiment. As an option, the present method 800 may be implemented in conjunction with features from any other embodiment listed herein, such as those described with reference to the other FIGS. Of course, however, such method 900 and others presented herein may be used in various applications and/or in permutations, which may or may not be specifically described in the illustrative embodiments listed herein. Moreover, more or less operations than those shown in FIG. 8 may be included in method 800, according to various embodiments. Furthermore, while exemplary processing techniques are presented, other known processing techniques may be used for various steps.

As shown in FIG. 8 according to one approach, a substrate 102 is etched to form an array of pillars 104 and cavity regions 106, with the array pattern defined by a photolithographic mask 310. See the transition from structure 802 to structure 804. Etching the substrate 102 may include such techniques as, dry etching by high density plasma (e.g. reactive ion etching), wet etching using a surfactant, etc. Additionally, if the substrate 102 has been etched using a high density plasma etch, an optional step may include further wet etching the pillar surfaces using a surfactant in order to remove any plasma etch damage. Surfactants used during the wet etching may include ammonium fluoro alkyl sulfonamide in water, in some approaches.

After the pillars have been formed, a stress-reducing layer 812 is deposited to coat at least one portion of the pillars in the array, resulting in structure 806. The stress-reducing layer 812 may include, but is not limited to, dielectric materials, $SiO_2$, $Si_3N_4$, $SiN_x$, $SiO_xN_y$, $Ta_2O_5$, $Al_2O_3$, amorphous silicon and poly silicon, etc. The stress-reducing layer 812 may also have a thickness in a range of about 500 Å to about 2000 Å, in some approaches, but could be higher or lower.

After deposition of the stress-reducing layer 812, a neutron sensitive material 108 is deposited in the cavity regions 106 between the pillars 104 in the array, such that the stress-reducing layer 812 is positioned between the pillars 104 and the neutron sensitive material 108, as shown in structure 808. The neutron sensitive material 108 extending above the pillars 104 is then etched back so that at least a section of an upper portion of the stress-reducing layer 812 is exposed, where the upper portion of the stress-reducing layer is positioned away from the substrate. See structure 810. Etching back the neutron sensitive material 108 may be achieved using such techniques as plasma beam etching, ion beam etching, lapping, etc. In various approaches, after etching back the neutron sensitive material 108, the thickness of the remaining neutron sensitive material 108 may be greater than, less than or equal to the height of the stress-reducing layer 812, where the thickness of the neutron sensitive material is measured parallel to the longitudinal axes of the pillars 104. Additionally the thickness of the remaining neutron sensitive material 108 may be greater than, less than or equal to the height of the pillars 104 in the direction parallel to the axes, according to other approaches.

Figure 9A:
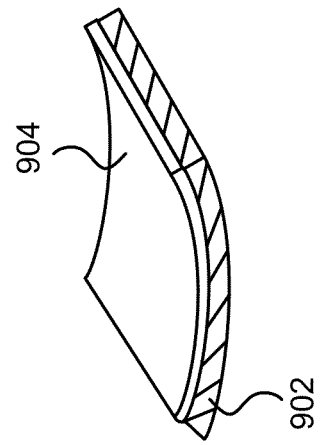
FIGS. 9A to 9I show schematics of an array of pillars with varying types and degrees of stress, according to one embodiment.
Figure 9B:
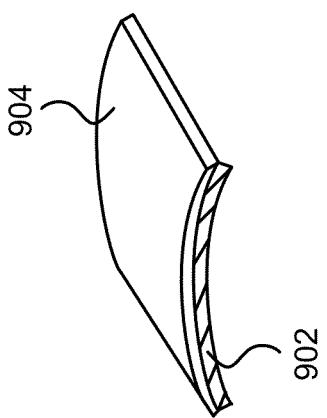
Figure 9C:
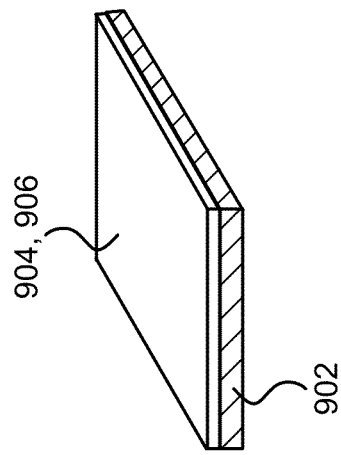

The neutron sensitive material 108, such as $^{10}B$, may subject the pillars in the array to stress, e.g. a tensile and/or compressive stress, ultimately leading to such deleterious effects as pillar cracking. Thus, in some approaches, the stress-reducing layer 812 may at least partially counteract a tensile and/or compressive stress exerted on the pillars by the neutron sensitive material. An example is provided in FIGS. 9A-9F, according to one embodiment. As shown in FIG. 9A, a substrate 902, e.g. a silicon substrate, coated with a stress-reducing layer 904, such as $SiO_2$, may exhibit a compressive stress. As shown in FIG. 9B, a substrate 902 coated with a layer 906 comprising, e.g. a neutron sensitive material such as $^{10}B$, may exhibit a tensile stress. However, a substrate 902 coated with both the stress-reducing layer 904 and the layer 906 may exhibit no stress, as illustrated in FIG. 9C.

Figure 9D:
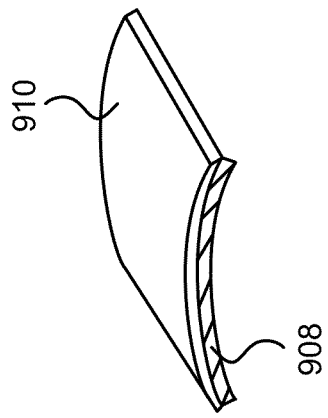
Figure 9E:
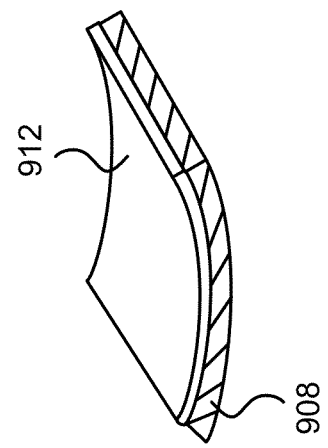
Figure 9F:
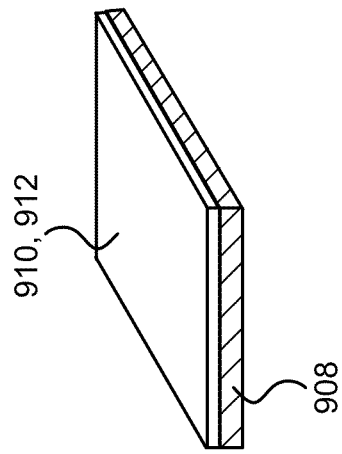

In another embodiment, a substrate 908 (e.g. silicon) coated with a stress-reducing layer 910 may exhibit a tensile stress, as shown in FIG. 9D. Conversely, a substrate 908 coated with a layer 912 comprising, e.g. a neutron sensitive material such as $^{10}B$, may exhibit a compressive stress, as shown in FIG. 9E. Accordingly, the substrate 902 coated with the stress-reducing layer 910 and the layer 906 may exhibit no stress, as illustrated in FIG. 9F.

Figure 9I:
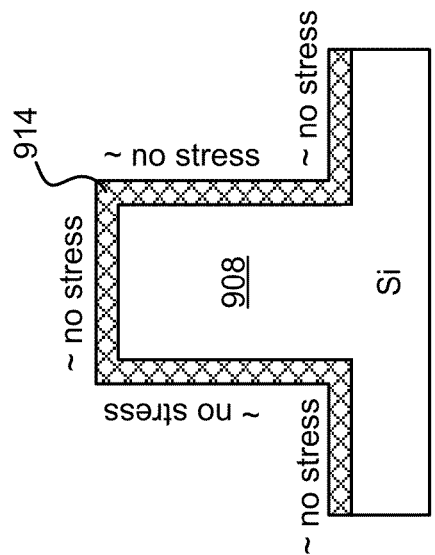
Figure 9H:
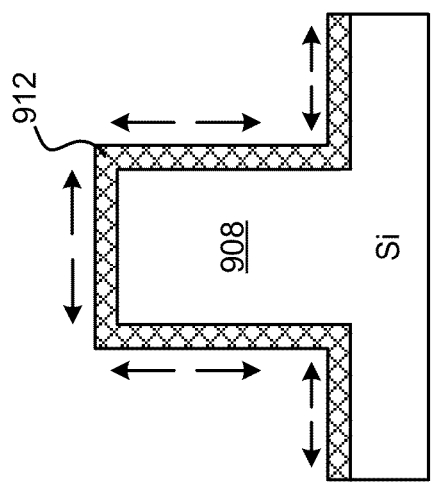
Figure 9G:
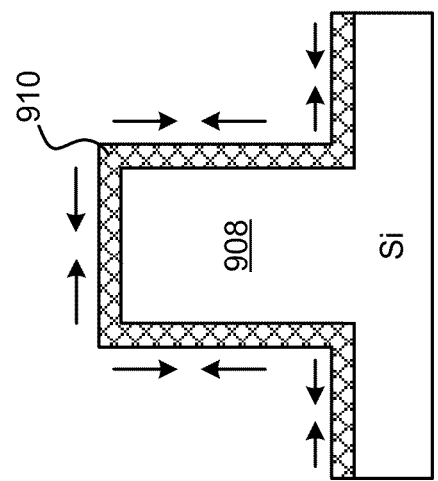
Figure 10A:
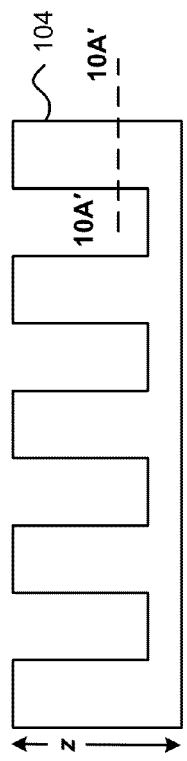
FIGS. 10A to 10G show schematics of various cross sectional shapes of the pillars, according to some embodiments.
Figure 10D:
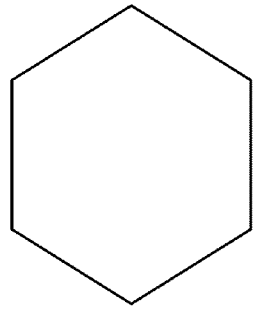
Figure 10G:
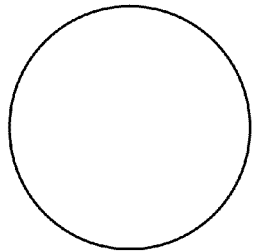
Figure 10C:
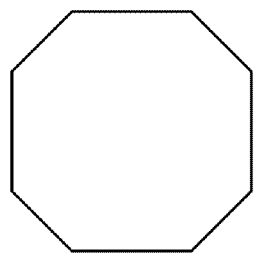
Figure 10F:
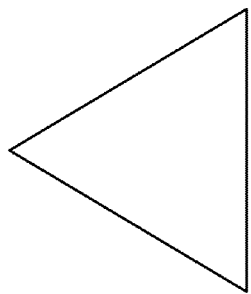
Figure 10B:
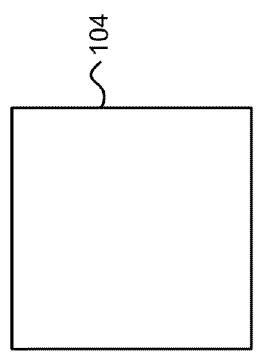
Figure 10E:
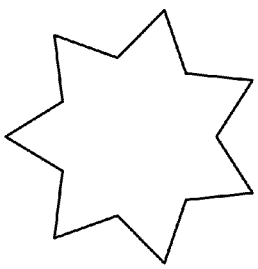

Further, as shown in FIG. 9G, a silicon pillar 908 coated with a $SiO_2$ compressive layer 910 may subject the pillar 908 to a compressive stress (as indicated by the direction of the illustrated arrows) in one approach. Conversely, a silicon pillar 908 coated with a $SiN_x$ compressive layer 912 may subject the pillar 908 to a tensile stress (as indicated by the illustrative arrows) in another approach shown in FIG. 9H. Consequently, tuning the relative amounts of oxygen and nitrogen in a $SiO_xN_y$ compressive layer 914 present on a pillar 908 may result in about no stress to the silicon pillar 908, as shown in FIG. 9I according to yet another approach.

With continued reference to FIG. 8, one or more parameters during the deposition, e.g. chemical vapor deposition, of the stress-reducing layer 812 may be modified to alter counteraction of a stress, e.g. a tensile and/or compressive stress, according to one embodiment. Said parameters may include, but are not limited to, temperature, RF power, concentration of one or more backflowing gases, etc.

In another embodiment, the stress-reducing layer 812 may have a physical characteristic of mitigating diffusion of H and/or $^{10}B$ into the pillars during a deposition process. In yet another embodiment, the stress-reducing layer 812 may have a physical characteristic of reducing leakage current arising from bandgap shrinkage.

Any of the methods described above, taken individually or in combination, in whole or in part, may be included in or used to make one or more systems, structures, etc. For example, a thermal neutron detector may include a structure having an array of pillars, a cavity region between the pillars and a neutron sensitive material located in each cavity. Further said apparatus may implement the features from any other embodiments listed herein.

In addition, any of the features presented herein may be combined in any combination to create various embodiments, any of which fall within the scope of the present invention. Following are several examples of general and specific embodiments.

For example, in one embodiment, each of the pillars may comprise silicon (Si). In other embodiments, each of the pillars may comprise an aspect ratio of less than about 5:1, less than about 10:1; less than about 25:1; less than about 50:1; or less than about 100:1.

In yet another embodiment, each of the pillars may have a rounded cross sectional shape where the cross section is taken perpendicular to a longitudinal axis of the respective pillar. The rounded cross sectional shape of the pillars may be at least one of circular and ellipsoid in some approaches. In more approaches, the rounded cross sectional shape of each of the pillars may have a physical characteristic of reducing a stress, e.g. a tensile and/or compressive stress, associated with an array of pillars. In other approaches, the rounded cross sectional shape of each of the pillars may have a physical characteristic of reducing a deposition rate of the neutron sensitive material on each of the pillars.

In a further embodiment, a separation between each of the pillars may be about uniform. The about uniform separation between each of the pillars may have a physical characteristic of reducing a stress associated with the array of pillars in some approaches. For example, an about uniform separation between the pillars may result where the pillars are arranged in a hexagonally close packed (HCP) array (see 502 of FIG. 5). In such approaches where the pillars may be arranged in a HCP array, the cavity regions between each of the pillars may be conceptually thought of as sections each having a generally triangular cross sectional shape.

Additionally, in one embodiment, each of the pillars may have a tapered profile, as shown in FIG. 6. For instance, each pillar, having an upper portion and a lower portion, where the lower portion of each of the pillars is positioned towards a substrate, may have an upper portion with a smaller average diameter relative to an average diameter of the lower portion of the pillar, where the diameters are oriented perpendicular to a longitudinal axis of the pillar. In some approaches, the diameter of each lower portion and the diameter of each upper portion may be about constant along the longitudinal axis of the associated pillar. In others approaches, the upper portions of the pillars may have a dopant therein, where the dopant may have a physical characteristic of modifying, preferably increasing, an etch rate of the upper portion of each of the pillars. The dopant may include carbon, nitrogen, oxygen, hydrogen or other such suitable dopant as would be recognized by one skilled in the art upon reading the present disclosure.

According to another embodiment, the neutron sensitive material may not completely fill the cavity regions, thereby defining gaps in the cavity region that are not filled with the neutron sensitive material. Said gaps between the neutron sensitive material and at least an upper portion of each of the pillars may, in certain approaches, have a physical characteristic of reducing a stress, e.g. a tensile and/or compressive stress, associated with array of pillars. In additional approaches, the gaps may be filled with a second material such as a non-rigid material, a polymer, etc. to make the pillar array more robust, while preferably not imparting significant additional stress on the pillar array. In preferred approaches, the second material may be composed of a different material than the pillar and/or the neutron sensitive material.

According to yet another embodiment, the neutron sensitive material may have a dopant therein, where the dopant may have a physical characteristic of modifying, and preferably reducing, a stress (e.g. a tensile and/or compressive stress) associated with the neutron sensitive material. In various approaches, the dopant may include, but is not limited to, carbon, nitrogen, hydrogen, oxygen, etc.

According to a further embodiment, the neutron sensitive material filling the cavity regions may have physical characteristics of being formed via chemical vapor deposition. For example, the neutron sensitive material may comprise a conformal coating of said material within the cavity regions between the pillars. In an additional embodiment, the neutron sensitive material may be Boron-10 ($^{10}$B).

In yet another embodiment, a spacing may be present between the pillars and the neutron sensitive material. In various approaches, the spacing may have a physical characteristic of a previously-present sacrificial layer that has been removed after formation of the neutron sensitive material in the cavity regions between each of the pillars. In preferred approaches, the spacing may be empty, e.g. devoid of at least 90% by volume of a previously-present sacrificial layer.

Further, in one embodiment, the array of pillars may comprise a stress-reducing layer coating at least a portion of each of the pillars, where the stress-reducing layer may be positioned between the pillars and neutron sensitive material. The stress-reducing layer may comprise a dielectric material, $SiO_2$, $Si_3N_4$, $SiO_xN_y$, $Ta_2O_5$, $Al_2O_3$, amorphous silicon, poly silicon, etc. The stress-reducing layer may also have a thickness of less than about 2000 Å, less than about 1000 Å, less than about 500 Å, etc. in one approach.

In some approaches the stress-reducing layer may at least partially counteract a tensile and/or compressive stress exerted on the pillars by the neutron sensitive material (e.g. as shown in FIG. 9A-F). In other approaches, the stress-reducing layer may have a physical characteristic of reducing current leakage arising from bandgap shrinkage. In even more approaches, the stress-reducing layer may have a characteristic of mitigating diffusion of H and/or $^{10}$B into the pillars during a chemical vapor deposition process.

In additional embodiments, the array of pillars may be segmented into discrete segments of the pillars, where an average distance between adjacent pillars in each of the segments is less than an average distance between adjacent segments, as shown in FIG. 5. Moreover, a size of each of the segments may be less than a crack domain size, where the crack domain size is defined as the diameter or a region with no cracked boron.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
    an array of pillars, wherein each of the pillars comprises a rounded cross sectional shape where the cross section is taken perpendicular to a longitudinal axis of the respective pillar;
    a cavity region between each of the pillars; and
    a neutron sensitive material located in each cavity region, wherein the array is segmented into discrete segments of the pillars, wherein an average distance between adjacent pillars in each of the segments is less than an average distance between adjacent segments.

2. The apparatus of claim 1, wherein the neutron sensitive material is Boron-10 ($^{10}$B).

3. The apparatus of claim 1, wherein each of the pillars comprises an aspect ratio of less than about 50:1.

4. The apparatus of claim 1, wherein each of the pillars comprises silicon (Si).

5. The apparatus of claim 1, wherein the rounded cross sectional shape of each of the pillars is at least one of circular and ellipsoid.

6. The apparatus of claim 1, wherein the neutron sensitive material does not completely fill the cavity region, thereby defining gaps in the cavity region that are not filled with the neutron sensitive material.

7. The apparatus of claim 6, wherein the gaps are filled with a second material.

8. The apparatus of claim 1, wherein a spacing is present between the pillars and the neutron sensitive material.

9. A method for forming the apparatus of claim 8, the method comprising:
forming the pillars;
applying a sacrificial layer to the pillars;
depositing the neutron sensitive material in the cavity region over the sacrificial layer;
removing an upper portion of the neutron sensitive material to expose a portion of the sacrificial layer; and
applying an etchant to substantially remove the sacrificial layer.

10. The apparatus of claim 1, wherein the neutron sensitive material has a dopant therein, the dopant having a physical characteristic of modifying a stress of the neutron sensitive material.

11. An apparatus for detecting neutrons, comprising:
an array of pillars, wherein a separation between each of the pillars is about uniform;
a cavity region between each of the pillars; and
a neutron sensitive material located in the cavity region, wherein the neutron sensitive material has a dopant therein, the dopant having a physical characteristic of modifying a stress of the neutron sensitive material,
wherein the neutron sensitive material is Boron-10 ($^{10}B$).

12. The apparatus of claim 11, wherein the at least one dopant is selected from a group consisting of: oxygen, carbon, hydrogen, and combinations thereof.

13. The apparatus of claim 11, wherein the array of pillars are arranged in a hexagonally close packed array.

14. The apparatus of claim 11, wherein the neutron sensitive material does not completely fill the cavity region, thereby defining gaps in the cavity region that are not filled with the neutron sensitive material.

15. The apparatus of claim 14, wherein the gaps are filled with a second material.

16. The apparatus of claim 11, wherein a spacing is present between the pillars and the neutron sensitive material.

17. A method for forming the apparatus of claim 16, the method comprising:
forming the pillars;
applying a sacrificial layer to the pillars;
depositing the neutron sensitive material in the cavity region over the sacrificial layer;
removing an upper portion of the neutron sensitive material to expose a portion of the sacrificial layer; and
applying an etchant to substantially remove the sacrificial layer.

18. An apparatus for detecting neutrons, comprising:
a substrate;
an array of pillars above the substrate, wherein each of the pillars has an upper portion and a lower portion, wherein the lower portion of each of the pillars is positioned towards the substrate, wherein the upper portion of each pillar has a smaller average diameter relative to an average diameter of the lower portion of the pillar where the diameters are oriented perpendicular to a longitudinal axis of the pillar;
a cavity region between each of the pillars; and
a neutron sensitive material located in the cavity region.

19. The apparatus of claim 18, wherein the neutron sensitive material is Boron-10 ($^{10}B$).

20. The apparatus of claim 18, wherein a diameter of each lower portion is about constant along the longitudinal axis of the associated pillar, wherein a diameter of each upper portion is about constant along the longitudinal axis of the associated pillar.

21. The apparatus of claim 18, further comprising a dopant in the upper portion of each of the pillars, wherein the dopant has a physical characteristic of increasing an etch rate of the upper portion of each of the pillars.

22. The apparatus of claim 21 wherein the dopant in the upper portion of each of the pillars includes at least one of: phosphorous and arsenic.

23. The apparatus of claim 18, wherein the neutron sensitive material does not completely fill the cavity region, thereby defining gaps in the cavity region that are not filled with the neutron sensitive material.

24. The apparatus of claim 23, wherein the gaps are filled with a second material.

25. A method for forming the apparatus of claim 18, the method comprising:
forming the pillars;
etching the upper portions of the pillars for reducing the average diameters thereof; and
depositing the neutron sensitive material in the cavity region between the pillars.

26. The method of claim 25, wherein the neutron sensitive material is deposited via chemical vapor deposition.

27. The method of claim 25, wherein etching the upper portions of the pillars comprises wet etching.

28. The apparatus of claim 18, wherein a spacing is present between the pillars and the neutron sensitive material.

29. A method for forming the apparatus of claim 28, the method comprising:
forming the pillars;
applying a sacrificial layer to the pillars;
depositing the neutron sensitive material in the cavity region over the sacrificial layer;
removing an upper portion of the neutron sensitive material to expose a portion of the sacrificial layer; and
applying an etchant to substantially remove the sacrificial layer.

30. The apparatus of claim 28, wherein for each pillar, the spacing extends along an entirety of each side of the pillar that is oriented perpendicular to an upper surface of the substrate.

31. The apparatus of claim 18, wherein the neutron sensitive material has a dopant therein, the dopant having a physical characteristic of modifying a stress of the neutron sensitive material.

32. An apparatus for detecting neutrons, comprising:
an array of pillars;
a cavity region between each of the pillars;
a neutron sensitive material located in each cavity region; and
a stress-reducing layer coating at least a portion of each of the pillars and positioned between the pillars and the neutron sensitive material, wherein the stress-reducing layer at least partially counteracts a tensile and/or compressive stress exerted on the pillars by the neutron sensitive material.

33. The apparatus of claim 32, wherein the neutron sensitive material is Boron-10 ($^{10}$B).

34. The apparatus of claim 32, wherein the stress-reducing layer has a thickness of less than about 2000 Å.

35. The apparatus of claim 32, wherein the stress-reducing layer comprises a dielectric material.

36. The apparatus of claim 32, wherein the neutron sensitive material does not completely fill the cavity region, thereby defining gaps in the cavity region that are not filled with the neutron sensitive material.

37. The apparatus of claim 36, wherein the gaps are filled with a second material.

38. A method for forming the apparatus of claim 32, the method comprising:
    forming the pillars;
    depositing the stress-reducing layer to at least one portion of each of the pillars; and depositing the neutron sensitive material in the cavity region.

39. The method of claim 38, further comprising modifying a parameter during deposition of the stress-reducing layer to alter counteraction of the tensile and/or compressive stress.

40. The method of claim 38, wherein the stress-reducing layer has a physical characteristic of mitigating diffusion of H and/or $^{10}$B into the pillars during a chemical vapor deposition process.

41. The apparatus of claim 32, wherein a spacing is present between the pillars and the neutron sensitive material.

42. A method for forming the apparatus of claim 41, the method comprising:
    forming the pillars;
    applying a sacrificial layer to the pillars;
    depositing the neutron sensitive material in the cavity region over the sacrificial layer;
    removing an upper portion of the neutron sensitive material to expose a portion of the sacrificial layer; and
    applying an etchant to substantially remove the sacrificial layer.

43. The apparatus of claim 32, wherein the neutron sensitive material has a dopant therein, the dopant having a physical characteristic of modifying.

\* \* \* \* \*